US012602064B2

(12) United States Patent
Koshiishi et al.

(10) Patent No.: US 12,602,064 B2
(45) Date of Patent: Apr. 14, 2026

(54) ROBOT

(71) Applicant: HONDA MOTOR CO., LTD., Tokyo (JP)

(72) Inventors: Takeshi Koshiishi, Saitama (JP);
Yasushi Takahashi, Saitama (JP);
Masaki Ueyama, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 414 days.

(21) Appl. No.: 18/550,974

(22) PCT Filed: Mar. 19, 2021

(86) PCT No.: PCT/JP2021/011328
§ 371 (c)(1),
(2) Date: Sep. 18, 2023

(87) PCT Pub. No.: WO2022/195841
PCT Pub. Date: Sep. 22, 2022

(65) Prior Publication Data
US 2024/0176368 A1 May 30, 2024

(51) Int. Cl.
*G05D 1/672* (2024.01)
*G05D 105/30* (2024.01)

(52) U.S. Cl.
CPC ......... *G05D 1/672* (2024.01); *G05D 2105/34* (2024.01)

(58) Field of Classification Search
CPC ...... B25J 11/008; B25J 5/007; B25J 19/0075; G05D 2105/34; H04N 7/142
See application file for complete search history.

(56) References Cited

U.S. PATENT DOCUMENTS

2012/0185094 A1* 7/2012 Rosenstein .............. B25J 5/007
901/1
2015/0077502 A1* 3/2015 Jordan ................... G16H 80/00
348/14.03
2017/0053572 A1 2/2017 Moore

FOREIGN PATENT DOCUMENTS

CN 106217393 A 12/2016
CN 109693242 A * 4/2019 ........... B25J 11/008
(Continued)

OTHER PUBLICATIONS

Kikuno, Tomoya et al., "Improvement of social telepresence by augmenting involuntary movements of a remote speaker" , non-official translation (Human Interface Society Research Report 2014, 2014, vol. 16 [CD-ROM], 2014, vol. 16, No. 4, pp. 47-52, entire text, all drawings Published on Jul. 2014.

*Primary Examiner* — Zakaria Elahmadi
(74) *Attorney, Agent, or Firm* — CKC & PARTNERS CO., LLC

(57) ABSTRACT

The present invention provides a robot that implements human action. The robot (1) is equipped with: a cover (15) which covers the torso part (12) so as to create a space between the cover and the torso part (12) and which is also capable of swaying; a first motor (162) and a second motor (172) which serve as power sources for causing the cover (15) to sway; and a first link mechanism (163) and a second link mechanism (173) which transmit the power of the first motor (162) and the second motor (172) to the cover (15). The head part has a control unit (141) that causes the first motor (162) and the second motor (172) to rotate on the basis of the advancing direction and the turning direction of the drive unit and causes the cover (15) to sway.

11 Claims, 25 Drawing Sheets

(56)             References Cited

FOREIGN PATENT DOCUMENTS

| JP | S6191479 U | 6/1986 | |
| JP | H03126593 U | 12/1991 | |
| JP | 2005288587 A | 10/2005 | |
| JP | 2006346764 A | 12/2006 | |
| JP | 2017054108 A | 3/2017 | |
| WO | WO-2012066678 A1 * | 5/2012 | .............. B25J 5/007 |

* cited by examiner (A)

(B)

(C)

ROBOT

TECHNICAL FIELD

The present invention relates to a robot.

BACKGROUND ART

A telepresence robot has been known as a robot which operates by remote control from a user terminal to realize teleconference, etc. (for example, refer to Patent Document 1). This telepresence robot includes: a self-propelled drive unit, a torso mounted to the drive unit, and a head having an imaging unit provided above the torso, and sends a picture captured by the imaging unit as a signal to the user terminal. Patent Document 1: Japanese Unexamined Patent Application, Publication No. 2017-054108

DISCLOSURE OF THE INVENTION

Problems to be Solved by the Invention

However, a conventional telepresence robot gives the impression of being inorganic and cold, such as when being completely stationary. A person often communicates their intention to their surroundings by means other than using words, by way of constantly moving various parts of their body. Since there are cases of not being able to communicate well with their surroundings when there is no expression using this body movement, the surrounding people may feel anxiety or fear, and thus have not desirable as a robot to be used in an environment to coexist with humans. Therefore, a robot has been demanded which can realize human-like motion.

The present invention has been made taking account of the above issues, and has an object of providing a robot which realizes human-like motion.

Means for Solving the Problems

A robot (for example, the robot 1, 8 described later) according to a first aspect of the present invention includes: a self-propelled drive unit (for example, the drive unit 11 described later); a torso (for example, the torso part 12 described later) equipped to the drive unit; and a head (for example, the head part 14 described later) provided above the torso and having an imaging unit (for example, the imaging unit 142 described later), in which the drive unit, the torso or the head has a transmitter (for example, the transmitter 146 described later) which transmits a picture captured by the imaging unit as a signal to a user terminal, and the robot further including a cover (for example, the cover 15 described later) which covers the torso so as to have a space between the torso, and is swingable; a motor (for example, the first motor 162, 862, second motor 172, 872 described later) serving as a power source which causes the cover to oscillate; and a power transmission mechanism (for example, the first link mechanism 163, second link mechanism 173, first cam 863, second cam 873 described later) which transmits motive power of the motor to the cover, in which the drive unit, the torso or the head includes a controller (for example, the controller 141 described later) which causes the motor to rotate to oscillate the cover, based on an advancing direction or turning direction of the drive unit.

According to the robot of the first aspect, motion simulating human beings becomes possible by swinging the cover based on the advancing direction or turning direction of the drive unit. Therefore, according to the robot of the first aspect, human-like motion can be realized.

According to a second aspect of the present invention, in the robot as described in the first aspect, the controller may start swinging of the cover prior to the drive unit advancing or turning.

According to the robot of the second aspect, since swinging of the cover will start prior to the drive unit advancing or turning, i.e. since the drive unit advances or turns triggered by the cover starting swinging, more human-like motion can be realized.

According to a third aspect of the present invention, in the robot as described in the first or second aspect, the power transmission mechanism may be a cam (for example, the first cam 863, second cam 873 described later) which rotates together with the motor to act on the cover.

According to the robot of the third aspect, it is possible to transmit motive power of the motor by a simple structure. In other words, it is possible to swing the cover with a simple structure.

According to a fourth aspect of the present invention, the robot as described in the first or second aspect may further include: a connecting member (for example, the first coil spring 161, second coil spring 171 described later) which connects the torso and the cover, in which the power transmission mechanism may be a link mechanism (for example, the first link mechanism 163, second link mechanism 173 described later) which converts rotational power of the motor into translational power, and the connecting member may have one end connected to the link mechanism, and another end connected to the cover.

According to the robot of the fourth aspect, it is possible to transmit motive power of the motor by a simple structure. In other words, it is possible to swing the cover with a simple structure.

According to a fifth aspect of the present invention, in the robot as described in the fourth aspect, the connecting member may be an elastic member.

According to the robot of the fifth aspect, since the connecting member connecting the torso and cover is an elastic member, it is possible to reliably swing the cover with a simple structure.

According to a sixth aspect of the present invention, in the robot as described in any one of the first to fifth aspects, the controller may cause the cover to swing so that a lower end of the cover tilts in a direction opposite to an advancing direction or turning direction of the drive unit.

According to the robot of the sixth aspect, motion simulating human beings becomes possible by swinging the cover so that the lower end of the cover tilts in the opposite direction to the advancing direction or turning direction of the drive unit. Therefore, according to the robot of the sixth aspect, more human-like motion can be realized.

According to a seventh aspect of the present invention, in the robot as described in any one of the first to sixth aspects, the controller may cause the cover to swing so as to make a tilt based on a speed or acceleration of the drive unit.

According to the robot of the seventh aspect, motion simulating human beings becomes possible by swinging the cover so as to make a tilt based on a speed or acceleration of the drive unit. Therefore, according to the robot of the seventh aspect, more human-like motion can be realized.

According to an eighth aspect of the present invention, the robot as described in any one of the first to seventh aspects may further include a tilt mechanism (for example, the tilt mechanism 148 described later) which tilts the torso or the head, in which the controller may cause the tilt mechanism to operate and tilt forward the torso or the head, in a case of swinging the cover.

According to the robot of the eighth aspect, motion simulating human beings becomes possible by further tilting forward the torso or the head in the case of swinging the cover. Therefore, according to the robot of the eighth aspect, more human-like motion can be realized.

According to a ninth aspect of the present invention, in the robot as described in the eighth aspect, the controller may cause the tilt mechanism to operate during advancing to tilt forward the torso or the head, and cause the tilt mechanism to operate during deceleration to tilt backward the torso or the head.

According to the robot of the ninth aspect, since it is possible to tilt forward the torso or head when advancing, and possible to tilt backwards the torso or head when decelerating, more human-like motion can be realized.

According to a tenth aspect of the present invention, in the robot as described in the eighth or ninth aspect, the controller may cause the tilt mechanism to operate to tilt forward the torso or the head at a fixed angle, in a case of speed not changing when advancing.

According to the robot of the tenth aspect, since it is possible to tilt forward the torso or head at a fixed angle in a case of speed not changing when advancing, more human-like motion can be realized.

According to an eleventh aspect of the present invention, in the robot as described in any one of the eighth to tenth aspects, the controller may cause the tilt mechanism to operate during oblique movement to tilt the torso or the head in an opposite direction to a movement direction.

According to the robot of the eleventh aspect, since it is possible to tilt the torso or the head in an opposite direction to the movement direction during oblique movement, more human-like motion can be realized.

Effects of the Invention

According to the present embodiment, it is possible to provide a robot which can realize more human-like motion than conventional.

PREFERRED MODE FOR CARRYING OUT THE INVENTION

Figure 1:
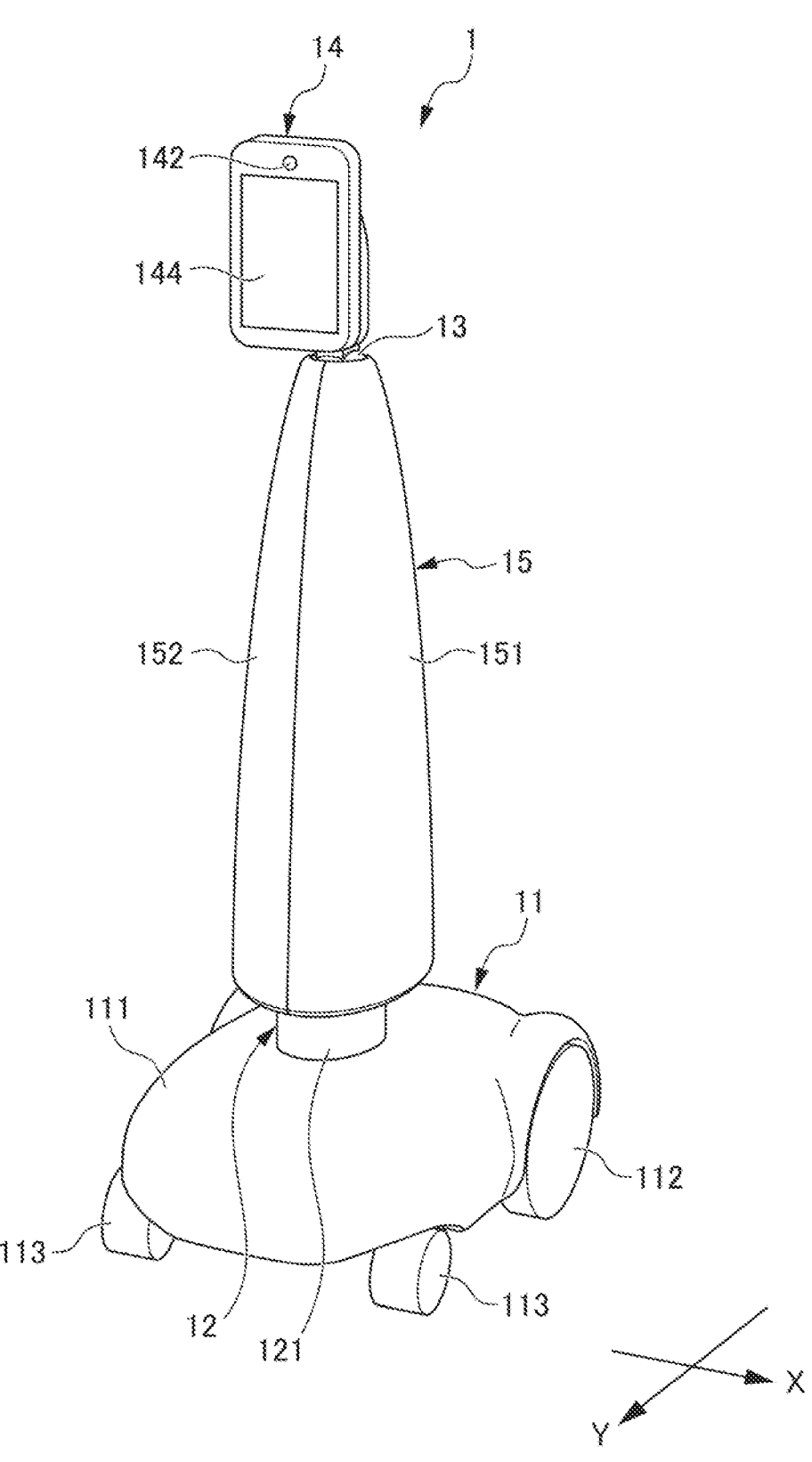
FIG. 1 is an external perspective view from a front side of a robot according to a first embodiment of the present invention.

Hereinafter, embodiments according to the present invention will be explained in detail while referencing the drawings. It should be noted that the arrow X in the drawings indicates the left/right direction when facing a travel direction, and the arrow Y indicates a front/rear direction when facing the travel direction; In addition, in the explanation of each embodiment of the second embodiment and later, the configurations, functions and effects shared with other embodiments are given the same reference symbol, and explanations thereof will be omitted as appropriate.

First Embodiment

Figure 2:
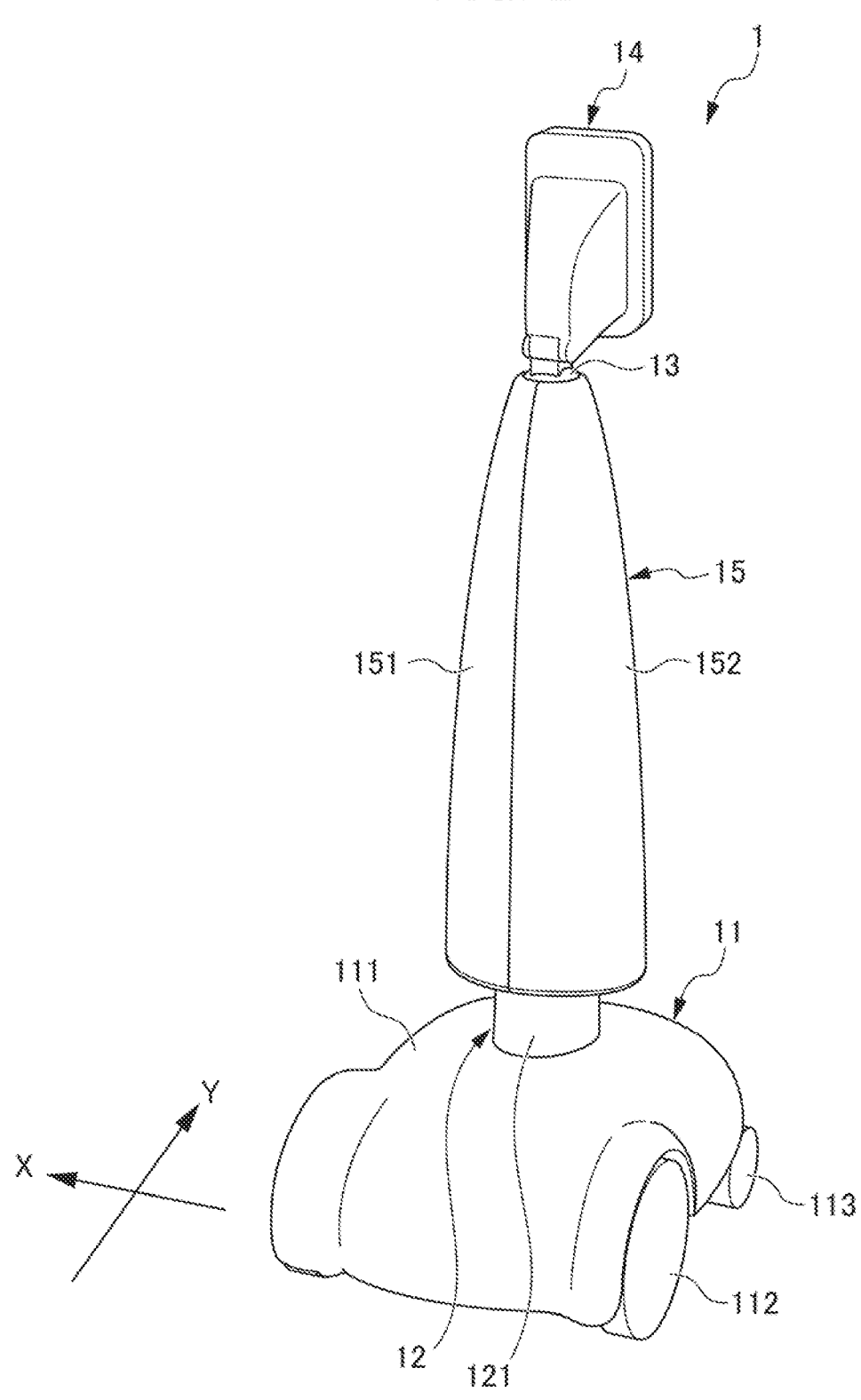
FIG. 2 is an external perspective view seen from a back side of the robot shown in FIG. 1.
Figure 3:
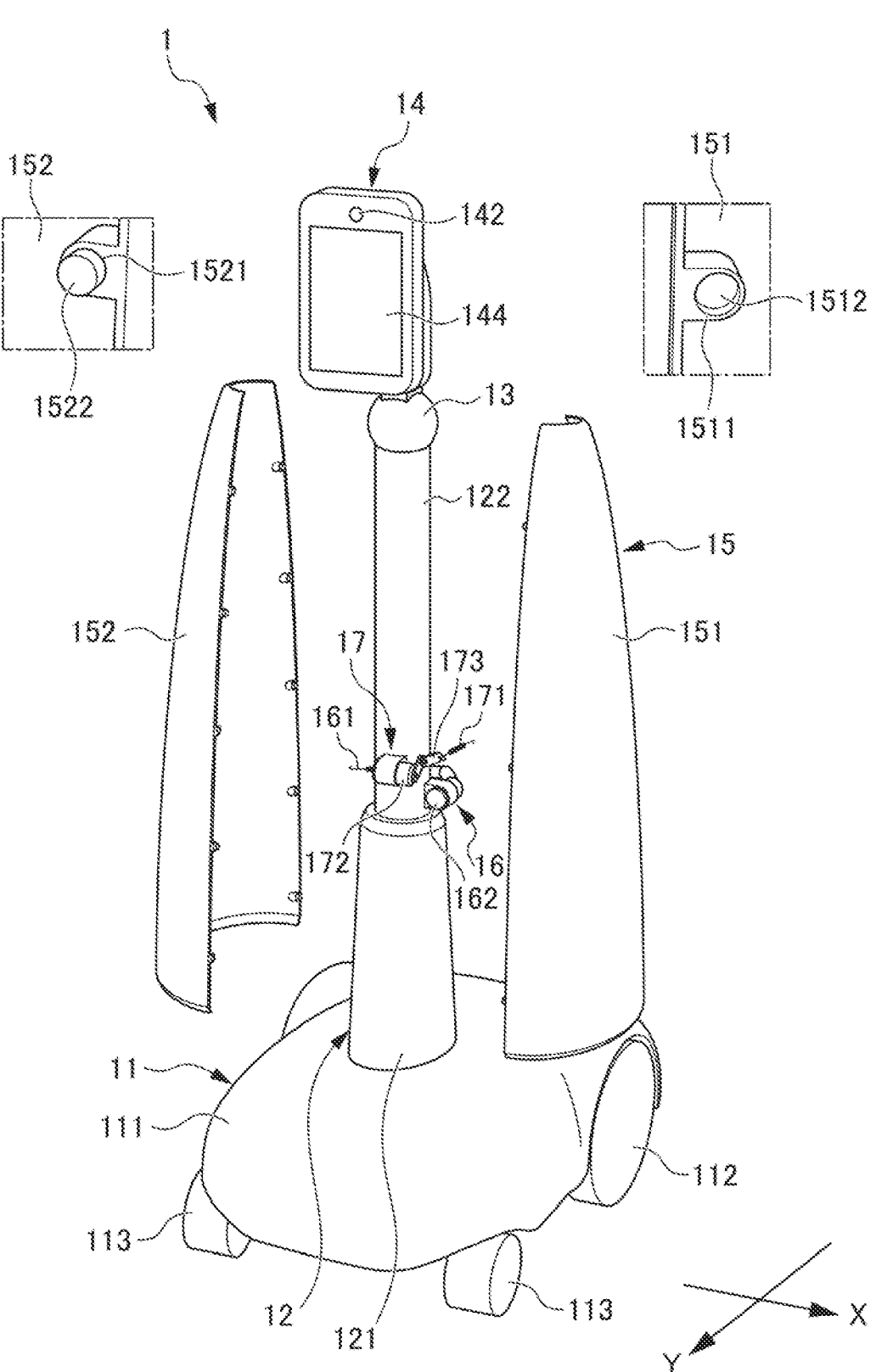
FIG. 3 is an exploded perspective view seen from a front side of the robot shown in FIG. 1, and shows portions as enlarged.
Figure 4:
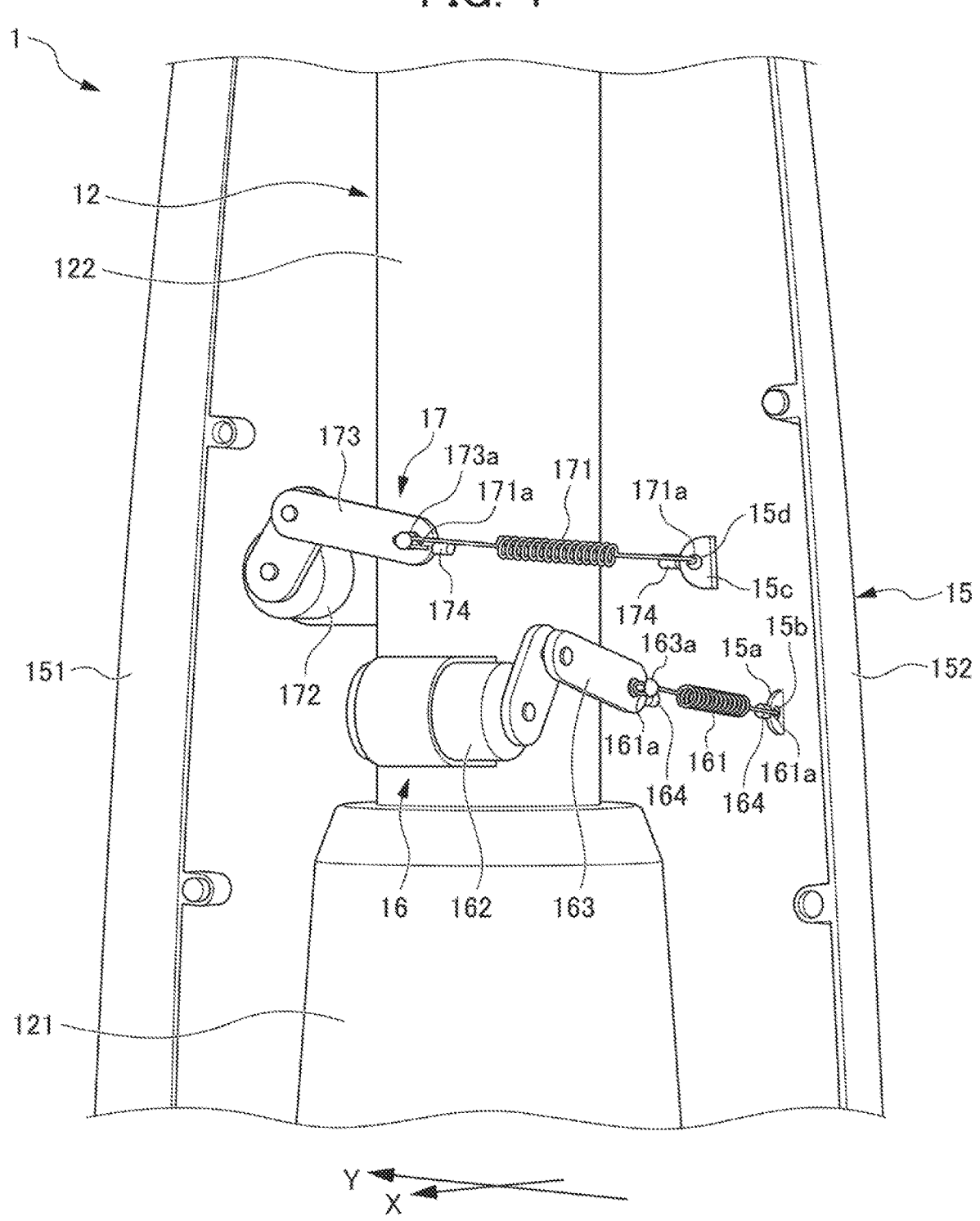
FIG. 4 is an enlarged perspective view seeing inside of the robot shown in FIG. 1 from a lateral side, and shows a state removing a left cover.
Figure 5:
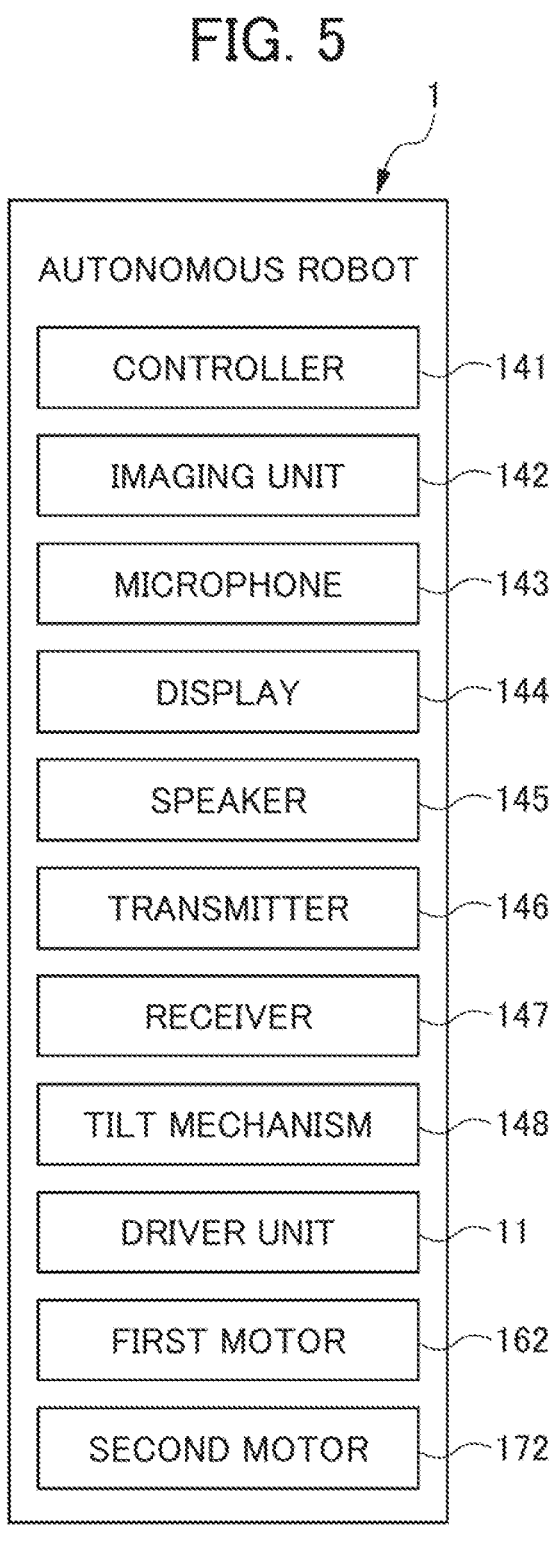
FIG. 5 is a block diagram of the robot shown in FIG. 1.

First, the configuration of a robot 1 according to the first embodiment of the present invention will be explained using FIGS. 1 to 5. FIG. 1 is an external perspective view seen from a front side of the robot 1. FIG. 2 is an external perspective view seen from a back side of the robot 1. FIG. 3 is an exploded perspective view seen from a front side of the robot 1, and shows portions as enlarged. FIG. 4 is an enlarged perspective view seeing inside of the robot 1 from a lateral side, and shows a state removing a left cover 151. FIG. 5 is a block diagram of the robot 1.

The robot 1 according to the present embodiment includes a telepresence robot which can conduct teleconference, movement, etc. as if the user were there, by operating by remote control by a user terminal connected via internet, and a work machine which operates remotely, etc. In other words, the robot 1 is a robot which acts as the avatar of a user who is at a remote location, and can not only act indoors, but also outdoors. For example, the user can play in a simulated zoo while being at home, without actually visiting the zoo, by remotely operating the robot 1 arranged in the zoo from home. This robot 1 is capable of movement imitating humans by swinging the cover 15 of a torso part 12, and can realize human-like motion as a result.

The user terminal is a terminal connected to the robot 1 via the internet, and has an input function of inputting information such as images, sound and characters, as well as an output function of outputting information such as images, sound and characters. As the user terminal, for example, a general-purpose machine such as a smartphone, tablet terminal or notebook personal computer is adopted.

More specifically, the robot 1 includes a drive unit 11, torso part 12, neck part 13, head part 14, cover 15, first swing mechanism 16, second swing mechanism 17, etc. This robot 1 is centrally controlled by a controller 141. In other words, the robot 1 operates under the control of the controller 141.

The drive unit 11 is a part corresponding to the legs of a human being. More specifically, the drive unit 11 includes a pedestal 111, drive wheels 112, steered wheels 113, etc. This drive unit 11 is self-propelled by having the drive wheels 112 and steered wheels 113, and performs advancing, retreating and turning of the robot 1. It should be noted that, in the present embodiment, the numbers of the drive wheels 112 and steered wheels 113 are illustrated as two each; however, the numbers of these are not limited to two each. For example, the drive unit 11 may have two of the drive wheels 112 and one of the steered wheels 113.

The pair of left and right drive wheels 112 and pair of left and right steered wheels 113 have tires mounted to both. Herein, the tires mounted to the pair of left and right drive wheels 112 are set so that at least one differs from left and right, among the outer circumference, shape and the position of the rotation center thereof. For example, by using an uneven thickness tire, it is possible to establish a tire differing in outer circumference and shape of left and right tires. In addition, the position of the rotation center differing from left and right indicates the position of the rotation center not being a left/right symmetrical position. In such a case, the robot 1 becomes able to oscillate and swing the cover 15 by simply advancing. Similarly, the tires mounted to the pair of left and right steered wheels 113 are set so that at least one differs between left and right among the outer circumference, shape and position of the center of rotation thereof. Also in such a case, the robot 1 becomes able to oscillate and swing the cover 15 by simply advancing.

The torso part 12 is a part corresponding to the torso of a human being. This torso part 12 is built into the pedestal 111 of the drive unit. 11, and is covered by the cover 15. More specifically, the torso part 12 includes a torso lower part 121, torso upper part 122, etc. The torso lower part 121 is formed integrally with the pedestal 111 of the drive unit 11 so as to be a substantially truncated cone shape, and supports the torso upper part 122. The torso upper part 122 is a columnar strut made of metal, and functions as a vertical shaft arranged along a vertical direction by being supported by the torso lower part 121.

The neck part 13 is a part corresponding to the neck of a human being. This neck part 13 is formed in a spherical shape, and is provided between the torso part 12 and head part 14. In other words, the neck part 13 links the head part 14 to the torso part 12.

The head part 14 is a part corresponding to the head of a human being. This head part 14 is provided to be able to tilt above the torso part 12 via the neck part 13. More specifically, the head part 14 includes a controller 141, imaging unit 142, microphone 143, display 144, speaker 145, transmitter 146, receiver 147, tilt mechanism 148, etc.

The controller 141 centrally controls the robot 1 by executing programs.

For example, the controller 141 identifies an audio signal received by the receiver 147, rotates a first motor 162 and second motor 172 based on this signal, and oscillates a first coil spring 161 and second coil spring 171. More specifically, the controller 141, in the case of the audio signal received by the receiver 147 being an audio signal of when the user talks, controls the first motor 162 and second motor 172 so as to slowly oscillate the first coil spring 161 and second coil spring 171 in a first period. This controller 141, in the case of the audio signal received by the receiver 147 being an audio signal when the user laughs, controls the first motor 162 and second motor 172 so as to make the first coil spring 161 and second coil spring 171 a oscillation of a different amplitude, frequency or direction than the case of being the audio signal when the user talks. More specifically, the controller 141, in the case of the audio signal received by the receiver 147 being the audio signal when the user laughs, controls the first motor 162 and second motor 172 so as to oscillate the first coil spring 161 and second coil spring 171 choppily in a second period which is shorter than the first period.

Alternatively, the controller 141 rotates the first motor 162 and second motor 172 based on the travel direction or turning direction of the drive unit 11 to swing the cover 15. More specifically, the controller 141 controls the first motor 162 and second motor 172 so as to start swinging of the cover 15 prior to the drive unit 11 advancing or turning. This controller 141 controls the first motor 162 and second motor 172 so that the lower end of the cover 15 tilts in the opposite direction to the advancing direction or turning direction of the drive unit 11 to swing the cover 15. Alternatively, the controller 141 may operate the tilt mechanism 148 to tilt the head part 14, in the case of controlling the first motor. 162 and second motor 172 to swing the cover 15. Furthermore, the controller 141 controls the first motor 162 and second motor 172 to swing the cover 15, so as to make a tilt based on the speed or acceleration of the drive unit 11.

The imaging unit 142 is an image input means. This imaging unit 142 captures an image ahead of the robot 1. The picture captured by the imaging unit 142 is sent as a signal in real time to the user terminal by the transmitter 146.

The microphone 143 is an audio input means. This microphone 143 converts sound such as speech generated in the surroundings of the robot 1. The signal of sound converted by the microphone 143 is sent in real time to the user terminal by the transmitter 146.

The display 144 is an image output means. This display 144 displays in real time a picture of the face of the user or the like captured at the user terminal.

The speaker 145 is a sound output means. This speaker 145 outputs in real time the sound such as speech generated in the surroundings of the user terminal.

The transmitter 146 is a communication means with the user terminal. This transmitter 146 transmits in real time the information such as images and sound inputted to the robot 1 to the user terminal as signals. For example, the transmitter 146 transmits in real time the pictures captured by the imaging unit 142 to the user terminal as signals.

The receiver 147 is a communication means with the user terminal. This receiver 147 receives in real time the information such as images, sound and characters inputted to the user terminal as signals.

The tilt mechanism 148 is a mechanism which tilts the head part 14, and is configured by motors, etc. which are omitted from the drawings.

The cover 15 is a part corresponding to the torso of a human being, and is a part corresponding to clothes due to having a design property and being wearable and changeable. This cover 15 is made of resin, for example, and is swingable with the neck part 13 as a fulcrum, by covering the torso part 12 so as to have a space between the torso part 12, and be supported by the neck part 13 at an upper end of this cover 15.

The cover 15 is supported in a state with the upper end thereof abutting the neck part 13, and without a gap between the upper end inside circumferential face thereof and the neck part 13. In addition, the lower end part of the cover 15 is not supported, and thereby more easily swings.

In addition, the cover 15 is a tapered shape (umbrella shape) in which the upper end and lower end are open so that the upper end is narrower than the lower end, and is placed on the neck part 13. Furthermore, the cover 15 is divisible into left and right. More specifically, the cover 15 includes a left cover 151 and a right cover 152.

The left cover 151 constitutes a left half of the cover 15. This left cover 151 has a plurality of holes 1511 spaced apart from each other, along the edge abutting the right cover 152, and arranges magnets 1512 into these holes 1511.

The right cover 152 constitutes a right half of the cover 15. This right cover 152 has a plurality of holes 1521 spaced apart from each other, along the edge abutting the left cover 151, and arranges magnets 1522 into these holes 1521.

In this way, the left cover 151 has a magnet dowel recess, and the right cover 152 has a magnet dowel convex. By such a configuration, the left cover 151 and right cover 152 combine to constitute the cover 15, by engaging the magnet. 1522 of the right cover 152 with the hole 1511 of the left cover 151 to stick to the magnet 1512. As a result, the cover 15 can be center divided and detached by a strong magnet.

The first swing mechanism 16 is a mechanism which swings the cover 15 in the left/right direction. More specifically, the first swing mechanism 16 includes a first coil spring 161, first motor 162, first link mechanism 163, pair of magnets 164, etc.

The first coil spring 161 is an elastic member arranged between the torso part 12 and cover 15. For example, as shown in FIG. 4, the first coil spring 161 can function as a connecting member connecting the torso part 12 and cover 15, and one end is connected to a leading end of the first link mechanism 16, and the other end is detachably connected to the cover 15. In more detail, hook-shaped engaging parts 161a respectively provided at both ends of the first coil spring 161 are engaged/separated relative to each of an engaged part 163a formed to protrude at a leading end of the first link mechanism 163, and a hole 15b formed in a mounting part 15a protruding from an inner wall of the cover 15 to the inner side, thereby becoming detachable. This first coil spring 161 oscillates in the horizontal X-axis direction (left/right direction, first axis direction), by being pulled to the first link mechanism 163, or the like.

The first motor 162 serves as a power source for oscillating the cover 15. This first motor 162 is fixed to a torso upper part 122 of the torso part 12.

The first link mechanism 163 is a power transmission mechanism which transmits the motive power of the first motor 162 to the cover 15 via the first coil spring 161, and converts the rotational power of the first motor 162 into translational power. This first link mechanism 163 has a base end attached to a shaft 162a of the first motor 162, and the leading end is attached to the first coil spring 161.

A pair of magnets 164 are attached to the leading end of a first coil spring mounting part of the cover 15, and a leading end of the first link mechanism 163 of the torso part 12. This pair of magnets 164 are strong magnets such as a neodymium-iron-boron type sintered magnet, and a samarium cobalt magnet, and prevents contact between the torso part 12 and cover 15 by the repulsive force thereof, by being arranged so that the S pole and S pole or N pole and N pole are opposing. More specifically, the pair of magnets 164 have a small repulsive force in a state separated from each other, and move relative to each other while receiving the influence of this small force. On other hand, the pair of magnets 164 have a large repulsive force in a state in which the cover 15 swings to approach each other, and do not approach to each other more than this by receiving the influence of this large force.

The second swing mechanism 17 is a mechanism which swings the cover 15 in the front/rear direction. More specifically, the second swing mechanism 17 includes a second coil spring 171, second motor 172, second link mechanism 173, pair of magnets 174, etc.

The second coil spring 171 is an elastic member arranged between the torso part 12 and cover 15. For example, as shown in FIG. 4, the second coil spring 171 can function as a connection member connecting the torso part 12 and cover 15, with one end connected to a leading end of the second link mechanism 173, and the other end detachably connected to the cover 15. In more detail, hook-shaped engaging parts 171a respectively provided at both ends of the second coil spring 171 are engaged/separated relative to each of an engaged part 173a formed to protrude at a leading end of the second link mechanism 173, and a hole 15d formed in a mounting part 15c protruding from an inner wall of the cover 15 to the inner side, thereby becoming detachable. This second coil spring 171 oscillates in a horizontal Y-axis direction (front/rear direction, second axis direction) which is perpendicular to the X-axis direction, by being pulled to the second link mechanism 173 or the like.

The second motor 172 serves as a power source oscillating the cover 15. This second motor 172 is fixed to a torso upper part 122 of the torso part 12.

The second link mechanism 173 is a power transmission mechanism which transmits the motive power of the second motor 172 to the cover 15 via the second coil spring 171, and converts the rotational power of the second motor 172 into translational power. This second link mechanism 173 has a base end attached to a shaft 172a of the second motor 172, and the leading end is attached to the second coil spring 171.

A pair of magnets 174 are attached to the leading end of a second coil spring attachment part of the cover 15, and a leading end of the second link mechanism 173 of the torso part 12. This pair of magnets 174 are strong magnets such as a neodymium-iron-boron type sintered magnet, and a samarium cobalt magnet, and prevents contact between the torso part 12 and cover 15 by the repulsive force thereof, by being arranged so that the S pole and S pole or N pole and N pole are opposing. More specifically, the pair of magnets 174 have a small repulsive force in a state separated from each other, and move relative to each other while receiving the influence of this small force. On other hand, the pair of magnets 174 have a large repulsive force in a state in which the cover 15 swings to approach each other, and do not approach to each other more than this by receiving the influence of this large force.

It should be noted that, in the example shown in FIG. 4, the first-axis direction which is the oscillation direction of the first coil spring 161 and the second-axis direction which is the oscillation direction of the second coil spring 171 are orthogonal; however, it is not limited thereto. The first-axis direction and second-axis direction are suitable so long as different directions from each other.

In addition, the first coil spring 161 and second coil spring 171 each may be established as a configuration having one end detachably connected to the torso part 12, and the other end detachably connected to the cover 15. In this case, the first link mechanism 163 and second link mechanism 173 are respectively directly connected to the cover 15. In other words, the first link mechanism 163 and second link mechanism 173 respectively transmit the power of each motor directly to the cover 15, without going through the first coil spring 161 and second coil spring 171. In addition, in this case, the coil spring is arranged above or below the link mechanism.

Figure 6:
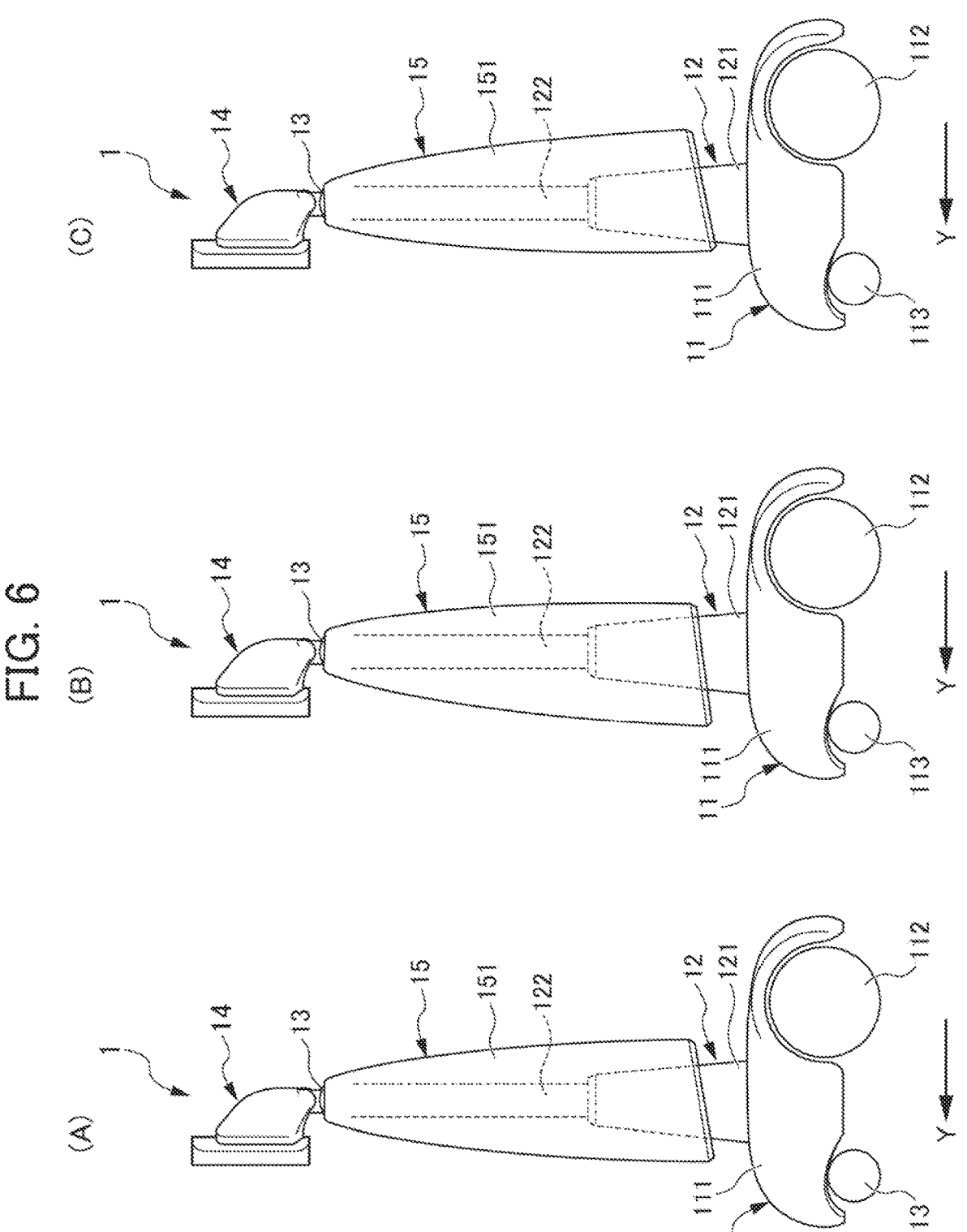
FIG. 6 provides lateral views of the robot shown in FIG. 1, with (A) showing a base posture, (B) showing the posture swinging the cover so that a lower end of the cover tilts downwards, and (C) showing a posture swinging the cover so that the lower end of the cover tilts forwards.
Figure 7:
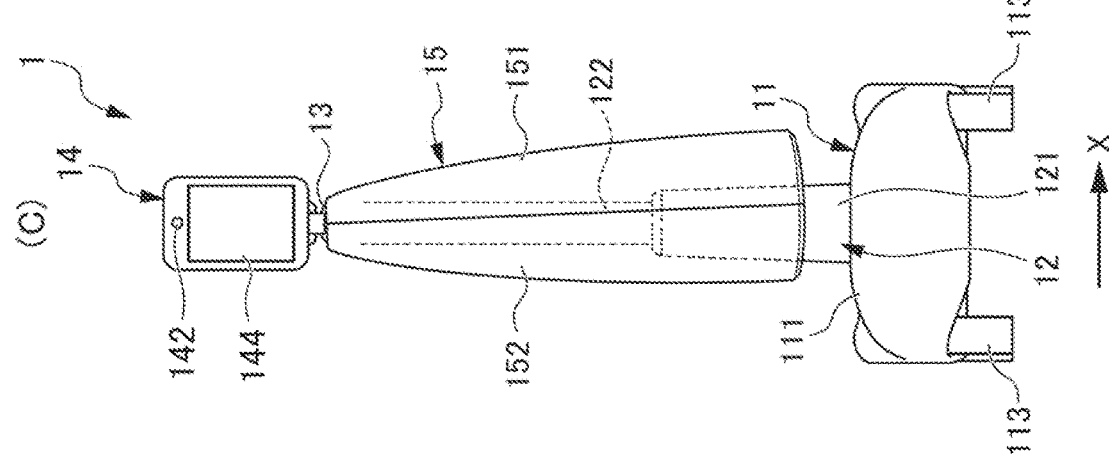
FIG. 7 provides front views of the robot shown in FIG. 1, with (A) showing the base posture, (B) showing the posture swinging the cover so that the lower end of the cover tilts to the right, and (C) showing the posture swinging the cover so that the lower end of the cover tilts to the left.
Figure 7:
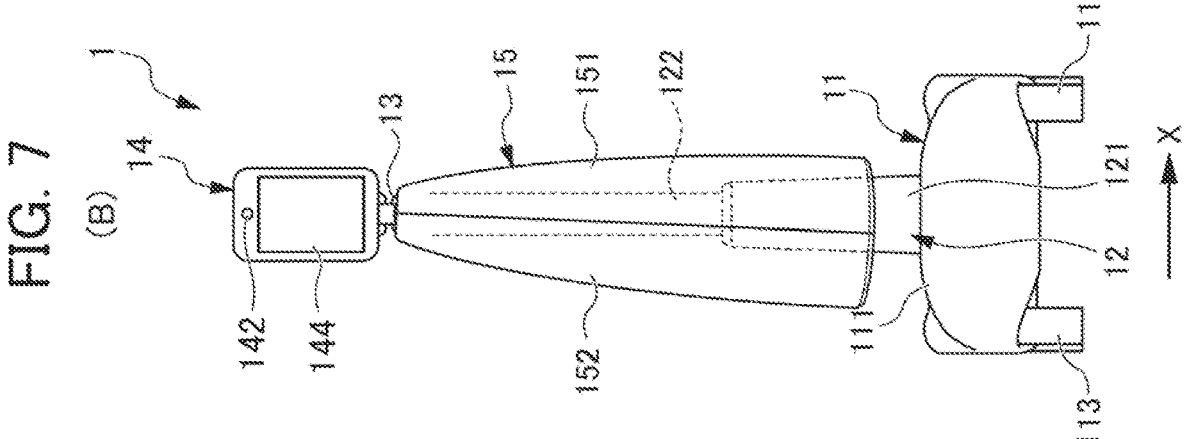
Figure 7:
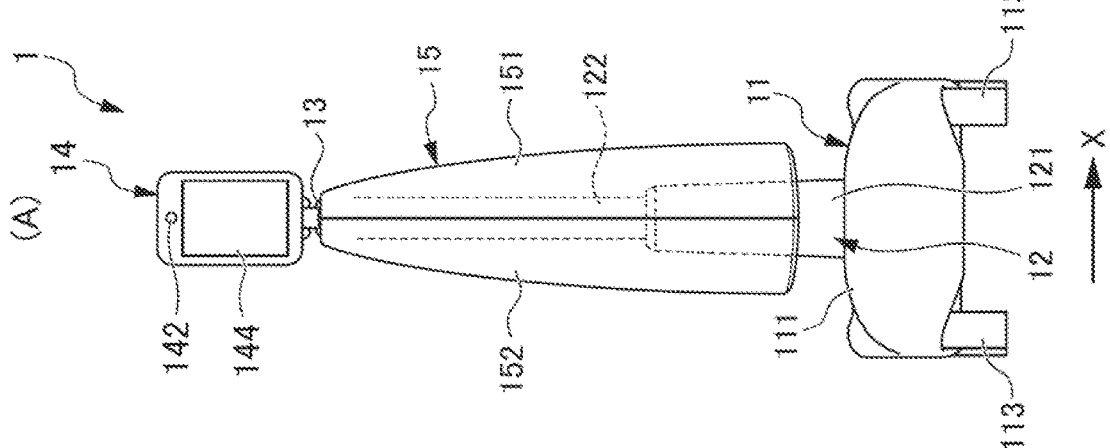

Next, operation of the robot 1 will be explained using FIG. 6 and FIG. 7. FIG. 6 is a side view of the robot 1. FIG. 6(A) shows a base posture. FIG. 6(B) shows a posture swinging the cover 15 so that a lower end of the cover 15 tilts forwards. FIG. 6(C) shows a posture swinging the cover 15 so that a lower end of the cover 15 tilts backwards. FIG. 7 is a front view of the robot 1. FIG. 7(A) shows a base posture. FIG. 7(B) shows a posture swinging the cover 15 so that the lower end of the cover 15 tilts to the right. FIG. 7(C) shows a posture swinging the cover 15 so that the lower end of the cover 15 tilts to the left.

When stopped, the robot 1 holds the base posture not swinging the cover 15 (refer to FIG. 6(A) and FIG. 7(A)).

When simply advancing from the stopped state, the robot 1 starts swinging of the cover 15 so that the lower end of the cover 15 tilts rearwards, and then operates the drive unit 11 to advance (refer to FIG. 6(A) to 6(B)). In this case, upon starting swinging of the cover 15, forward tilt of the head part 14 may be started therewith.

In the case of advancing and turning left from the stopped state, the robot 1 starts swinging of the cover 15 so that the lower end of the cover 15 tilts rearward and to the right, and then operates the drive unit 11 to advance and turn left (refer to FIG. 6(A) and FIG. 7(A)->FIG. 6(B) and FIG. 7(B)). In this case, upon starting swinging of the cover 15, forward tilt of the head part 14 may be started therewith.

In the case of advancing and turning right from a stopped state, the robot 1 starts swinging of the cover 15 so that the lower end of the cover 15 tilts rearward and to the left, and then operates the drive unit 11 to advance and turn right (refer to FIG. 6(A) and FIG. 7(A)->FIG. 6(C) and FIG. 7(C)). In this case, upon starting swinging of the cover 15, forward tilt of the head part 14 may be started therewith.

In the case of simply retreating from the stopped state, the robot 1 starts swinging of the cover 15 so that the lower end of the cover 15 tilts forwards, and then operates the drive unit 11 to retreat (refer to FIG. 6(A)->FIG. 6(C)). In this case, upon starting swinging of the cover 15, forward tilt of the head part 14 may be started therewith.

In the case of retreating and turning left from the stopped state, the robot 1 starts swinging of the cover 15 so that the lower end of the cover 15 tilts forwards and to the right, and then operates the drive unit 11 to retreat and turn left (refer to FIG. 6(A) and FIG. 7(A)->FIG. 6(C) and FIG. 7(B)). In this case, upon starting swinging of the cover 15, forward tilt of the head part 14 may be started therewith.

In the case of retreating and turning right from the stopped state, the robot 1 starts swinging of the cover 15 so that the lower end of the cover 15 tilts forwards and to the left, and then operates the drive unit 11 to retreat and turn right (refer to FIG. 6(A) and FIG. 7(A)->FIG. 6(C) and FIG. 7(C)). In this case, upon starting swinging of the cover 15, forward tilt of the head part 14 may be started therewith.

In the case of stopping from a state simply advancing, the robot 1 starts swinging of the cover 15 so that the lower end of the cover 15 tilts forwards, and then stops operation of the drive unit 11 (refer to FIG. 6(B)->FIG. 6(C)). Upon stopping, or after stopping, the robot 1 holds the base posture stopping swinging of the cover 15 (refer of FIG. 6(A)). It should be noted that, in the case of the head part 14 tilting forwards upon stopping, it is returned to a state not tilting the head part 14 forward.

In the case of stopping from a state advancing and turning left, the robot 1 starts swinging of the cover 15 so that the lower end of the cover 15 tilts forwards and to the left, and then stops operation of the drive unit 11 (refer to FIG. 6(B) and FIG. 7(B)->FIG. 6(C) and FIG. 7(C)). Upon stopping, or after stopping, the robot 1 holds the base posture stopping swinging of the cover 15 (refer of FIG. 6(A) and FIG. 7(A)). It should be noted that, in the case of the head part 14 tilting forwards upon stopping, it is returned to a state not tilting the head part 14 forward.

In the case of stopping from a state advancing and turning right, the robot 1 starts swinging of the cover 15 so that the lower end of the cover 15 tilts forwards and to the right, and then stops operation of the drive unit 11 (refer to FIG. 6(B) and FIG. 7(C)->FIG. 6(C) and FIG. 7(B)). Upon stopping, or after stopping, the robot 1 holds the base posture stopping swinging of the cover 15 (refer of FIG. 6(A) and FIG. 7(A)). It should be noted that, in the case of the head part 14 tilting forwards upon stopping, it returns to a state not tilting the head part 14 forward.

In the case of stopping from a state simply retreating, the robot 1 starts swinging of the cover 15 so that the lower end of the cover 15 tilts rearwards, and then stops operation of the drive unit 11 (refer to FIG. 6(C)->FIG. 6(B)). Upon stopping, or after stopping, the robot 1 holds the base posture stopping swinging of the cover 15 (refer of FIG. 6(A)). It should be noted that, in the case of the head part 14 tilting forwards upon stopping, it is returned to a state not tilting the head part 14 forward.

In the case of stopping from a state retreating and turning left, the robot 1 starts swinging of the cover 15 so that the lower end of the cover 15 tilts rearward and to the left, and then stops operation of the drive unit 11 (refer to FIG. 6(C) and FIG. 7(B)->FIG. 6(B) and FIG. 7(C)). Upon stopping, or after stopping, the robot 1 holds the base posture stopping swinging of the cover 15 (refer of FIG. 6(A) and FIG. 7(A)).

It should be noted that, in the case of the head part 14 tilting forwards upon stopping, it is returned to a state not tilting the head part. 14 forward.

In the case of stopping from a state retreating and turning right, the robot 1 starts swinging the cover 15 so that the lower end of the cover 15 tilts rearwards and to the right, and then stops operation of the drive unit 11 (refer to FIG. 6(C) and FIG. 7(C)->FIG. 6(B) and FIG. 7(B)). Upon stopping, or after stopping, the robot 1 holds the base posture stopping swinging of the cover 15 (refer of FIG. 6(A) and FIG. 7(A)). It should be noted that, in the case of the head part 14 tilting forwards upon stopping, it is returned to a state not tilting the head part 14 forward.

In the case of advancing and turning left from a state simply advancing, the robot 1 starts swinging of the cover 15 so that the lower end of the cover 15 tilts rearwards and to the right, and then changes operation of the drive unit 11 (refer to FIG. 6(B) and FIG. 7(A)->FIG. 6(B) and FIG. 7(B)).

In the case of advancing and turning right from a state simply advancing, the robot 1 starts swinging of the cover 15 so that the lower end of the cover 15 tilts rearwards and to the left, and then changes operation of the drive unit 11 (refer to FIG. 6(B) and FIG. 7(A)->FIG. 6(B) and FIG. 7(C)).

In the case of advancing and turning right from a state advancing and turning left, the robot 1 starts swinging of the cover 15 so that the lower end of the cover 15 tilts rearwards and to the left, and then changes operation of the drive unit 11 (refer to FIG. 6(B) and FIG. 7(B)->FIG. 6(B) and FIG. 7(C)).

In the case of simply advancing from a state advancing and turning left, the robot 1 starts swinging of the cover 15 so that the lower end of the cover 15 tilts only rearwards, and then changes operation of the drive unit 11 (refer to FIG. 6(B) and FIG. 7(B)->FIG. 6(B) and FIG. 7(A)).

In the case of advancing and turning left from a state advancing and turning right, the robot 1 starts swinging of the cover 15 so that the lower end of the cover 15 tilts rearwards and to the right, and then changes operation of the drive unit 11 (refer to FIG. 6(B) and FIG. 7(C)->FIG. 6(B) and FIG. 7(B)).

In the case of simply advancing from a state advancing and turning right, the robot 1 starts swinging of the cover 15 so that the lower end of the cover 15 tilts only rearwards, and then changes operation of the drive unit 11 (refer to FIG. 6(B) and FIG. 7(C)->FIG. 6(B) and FIG. 7(A)).

In the case of retreating and turning left from a state simply retreating, the robot 1 starts swinging of the cover 15 so that the lower end of the cover 15 tilts forwards and to the right, and then changes operation of the drive unit 11 (refer to FIG. 6(C) and FIG. 7(A)->FIG. 6(C) and FIG. 7(B)).

In the case of retreating and turning right from a state simply retreating, the robot 1 starts swinging of the cover 15 so that the lower end of the cover 15 tilts forwards and to the left, and then changes operation of the drive unit 11 (refer to FIG. 6(C) and FIG. 7(A)->FIG. 6(C) and FIG. 7(C)).

In the case of retreating and turn right from a state retreating and turning left, the robot 1 starts swinging of the cover 15 so that the lower end of the cover 15 tilts forwards and to the left, and then changes operation of the drive unit 11 (refer to FIG. 6(C) and FIG. 7(B)->FIG. 6(C) and FIG. 7(C)).

In the case of simply retreating from a state retreating and turning left, the robot 1 starts swinging of the cover 15 so that the lower end of the cover 15 tilts only forwards, and then changes the operation of the drive unit 11 (refer to FIG. 6(C) and FIG. 7(B)->FIG. 6(C) and FIG. 7(A)).

In the case of retreating and turning left from a state retreating and turning right, the robot 1 starts swinging of the cover 15 so that the lower end of the cover 15 tilts forwards and to the right, and then changes operation of the drive unit 11 (refer to FIG. 6(C) and FIG. 7(C)->FIG. 6(C) and FIG. 7(B)).

In the case of simply retreating from a state retreating and turning right, the robot 1 starts swinging of the cover 15 so that the lower end of the cover 15 tilts only forwards, and then changes operation of the drive unit 11 (refer to FIG. 6(C) and FIG. 7(C)->FIG. 6(C) and FIG. 7(B)).

The tilting angle of the cover 15 becomes smaller with lower speed and becomes larger with higher speed, and becomes smaller with lower acceleration, and becomes larger with greater acceleration.

In addition, the robot 1 according to the present embodiment may operate the tilt mechanism 148 during advancing to tilt forward the head part 14, and operate the tilt mechanism 148 during deceleration to tilt back the head part 14. Alternatively, in the case of the speed not changing during advance, the tilt mechanism 148 may be operated to tilt forward the head part 14 at a fixed angle. Furthermore, the tilt mechanism 148 may be operated during diagonal movement to tilt the head part 14 in the opposite direction to the movement direction.

According to such a robot 1, motion imitating a human being becomes possible by swinging the cover 15. As a result, it is possible to realize human-like motion.

In addition, according to the robot 1, since the cover 15 is supported in a state in which the upper end of the cover 15 abuts the neck part 13, it is possible to more reliably support the cover 15, and possible to more reliably realize human-like motion.

In addition, according to the robot 1, since the cover 15 is supported in a state without a gap between the upper end-side inner circumferential surface of the cover 15 and the neck part 13, it is possible to more reliably support the cover 15, and possible to more reliably realize human-like motion.

In addition, according to the robot 1, since the lower end part of the cover 15 is not supported, it is possible to more reliably swing the cover 15; therefore, it is possible to realize a more human-like motion.

In addition, according to the robot 1, since the cover 15 is placed over the spherical neck part 13, it is possible to smoothly swing the cover 15 with the spherical neck part 13 as the fulcrum. As a result, it is possible to realize more human-like motion.

In addition, according to the robot 1, since at least one of the outer circumference, shape and position of the center of rotation of the tires equipped to the drive unit 11 differs between left and right, it is possible to swing the cover 15 just by traveling. Therefore, according to the robot 1, it is possible to realize more human-like motion.

In addition, according to the robot 1, since the first coil spring 161 and second coil spring 171 arranged between the torso part 12 and cover 15 absorb external forces, it is possible to curb wasteful shaking of the cover 15. In addition, it is possible to avoid the torso part and cover from contacting when the cover shakes. As a result, it is possible to realize more human-like motion.

In addition, according to the robot 1, since the first coil spring 161 oscillating in the X-axis direction and the second coil spring 171 oscillating in the Y-axis direction are included as elastic members, the front/rear, left/right, and oblique complex swinging becomes possible. As a result, it is possible to realize more human-like motion.

In addition, according to the robot 1, since the first motor 162 and second motor 172 serving as power sources are included, it is possible to actively swing the cover 15. As a result, it is possible to realize more human-like motion.

In addition, according to the robot 1, the first link mechanism 163 transmits the motive power of the first motor 162 to the cover 15 via the first coil spring 161, and the second link mechanism 173 transmits the motive power of the second motor 172 to the cover 15 via the second coil spring 171; therefore, it is possible to collectively arrange each link mechanism and each coil spring at one location, and thus possible to establish the robot 1 in a compact configuration.

In addition, according to the robot 1, it is possible to transmit the motive power of the first motor 162 and second motor 172 to the cover 15 with a simple structure. In other words, it is possible to swing the cover 15 with a simple structure.

In addition, according to a modified example of the robot 1, it is possible to establish each link mechanism as a structure which can transmit the motive power of each motor to the cover 15 without going through the respective coil springs, and in this case, it is possible to more reliably realize human-like motion.

In addition, according to a modified example of the robot 1, it is possible to establish as a structure in which the coil springs are arranged above or below the link mechanism, and in this case, it is possible to reliably transmit the motive power of each motor to the cover 15, and thus possible to more reliably realize human-like motion.

In addition, according to the robot 1, since the first coil spring 161 and second coil spring 171 are detachable relative to the torso part 12 or cover 15, it is possible to swing the cover 15 with a simple structure. In addition, according to the robot 1, it is possible to swing the cover 15 based on an audio signal of the user. As a result, it is possible to realize more human-like motion.

In addition, according to the robot 1, it is possible to swing the cover 15 when the user speaks. As a result, it is possible to realize more human-like motion.

In addition, according to the robot 1, compared to when the user talks, it is possible to choppily swing the cover 15 when the user laughs. As a result, it is possible to realize more human-like motion.

In addition, according to the robot 1, by swinging the cover 15 based on the advancing direction or turning direction of the drive unit 11, motion simulating a human being becomes possible. As a result, it is possible to realize more human-like motion.

In addition, according to the robot 1, since swinging of the cover 15 will start before the drive unit 11 advances or turns, i.e. since the drive unit 11 advances or turns with the trigger of the cover 15 starting swinging, it is possible to realize more human-like motion.

In addition, according to the robot 1, by swinging the cover 15 so that the lower end of the cover 15 tilts in the opposite direction to the advancing direction or turning direction of the drive unit 11, motion simulating a human being becomes possible. As a result, it is possible to realize more human-like motion.

In addition, according to the robot 1, by swinging the cover 15 so as to make a slope based on the speed or acceleration of the drive unit 11, motion simulating a human being becomes possible. As a result, it is possible to realize more human-like motion.

In addition, according to the robot 1, in the case of swinging the cover 15, by tilting further forward the torso part 12 or head part 14, motion simulating a human being becomes possible. As a result, it is possible to realize more human-like motion.

In addition, according to the robot 1, it is possible to tilt forward the torso part 12 or head part 14 during advance, and it is possible to tilt backward the torso part 12 or head part 14 during deceleration; therefore, it is possible to realize more human-like motion.

In addition, according to the robot 1, since it is possible to tilt forward the torso part 12 or head part 14 at a fixed angle in the case of the speed not changing during advance, it is possible to realize more human-like motion.

In addition, according to the robot 1, since it is possible to tilt the torso part 12 or head part 14 in the opposite direction to the movement direction during oblique movement, it is possible to realize more human-like motion.

Second Embodiment

Figure 8:
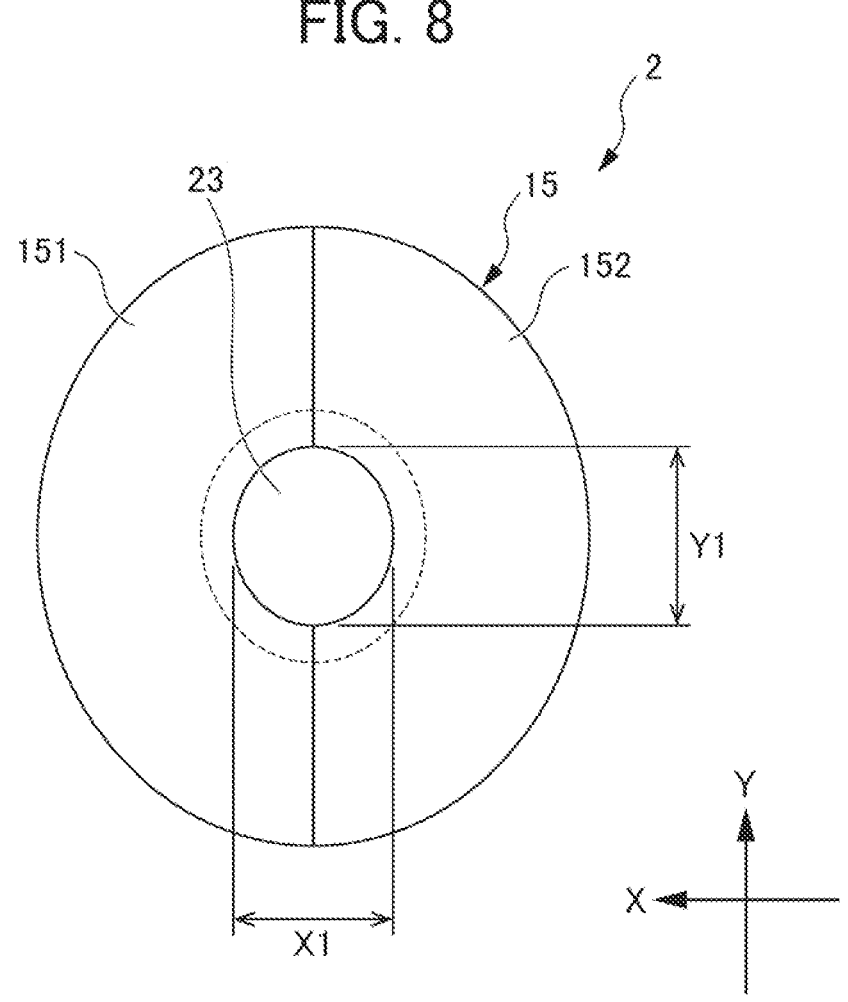
FIG. 8 is a top view of a robot according to a second embodiment of the present invention, and shows by omitting the head part.

The configuration of a robot 2 according to a second embodiment of the present invention will be explained using FIG. 8. FIG. 8 is a top view of the robot 2, and shows by omitting the head part 14.

The robot 2 shown in FIG. 8 differs from the robot 1 according to the first embodiment in the point of including a neck part 23 in place of the neck part 13.

The neck part 23 is formed to be ellipsoidal. This neck part 23 is arranged so that a short side direction which is a length X1 follows the X-axis direction, and the long side direction which is a length Y1 follows the Y-axis direction. It should be noted that a soft material may be interposed between the neck part 23 and cover 15, so as to be the same as a robot 3 according to a third embodiment described later.

According to such a robot 2, since the cover 15 is placed on the ellipsoidal neck part 23, it is possible to smoothly swing the cover 15 with the ellipsoidal neck part 23 as the fulcrum. As a result, it is possible to realize more human-like motion. In addition, since the neck part 23 is ellipsoidal, it is possible to prevent the cover 15 from wastefully rotating around the neck part 23.

Third Embodiment

Figure 9:
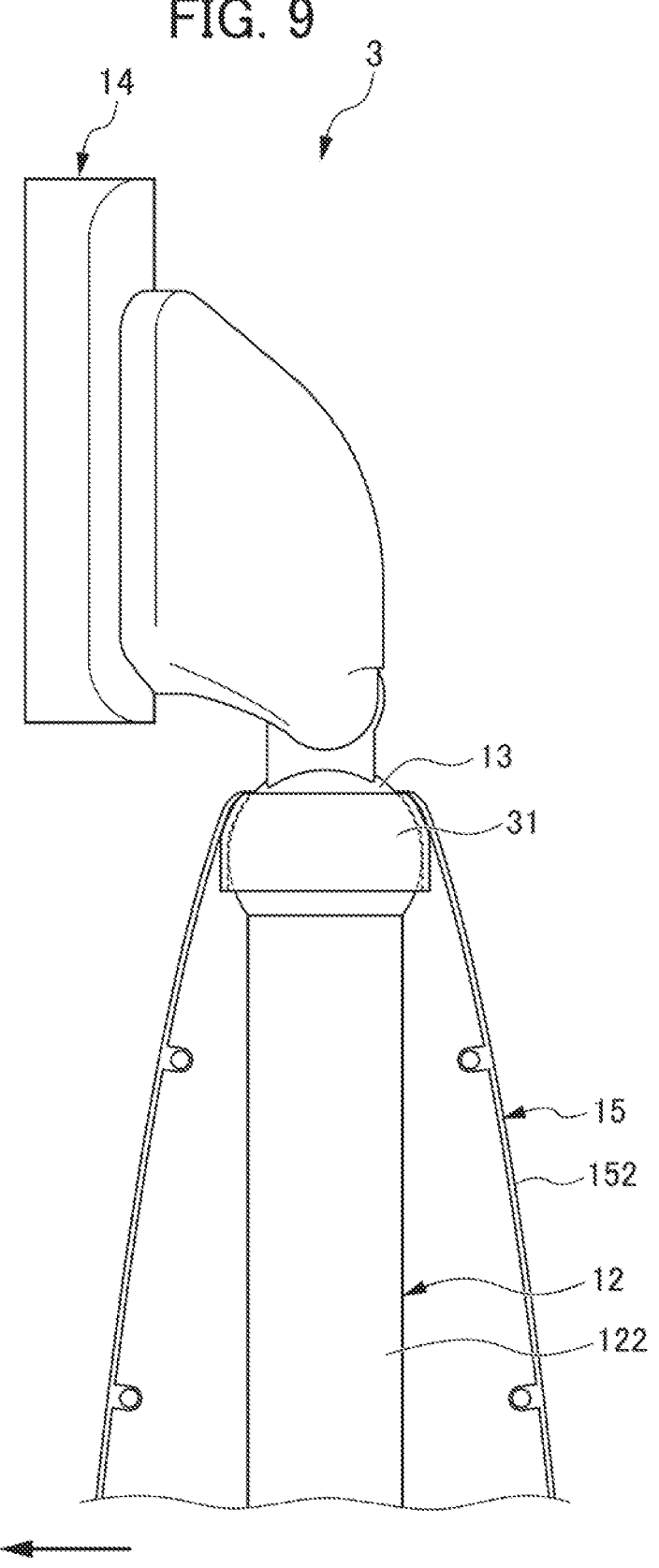
FIG. 9 is a side view showing a portion of a robot according to a third embodiment of the present invention, and shows a state removing a left cover.

Next, the configuration of a robot 3 according to a third embodiment of the present invention will be explained using FIG. 9. FIG. 9 is a side view showing a portion of the robot 3, and shows a state removing a left cover 151.

The robot 3 shown in FIG. 9 differs from the robot 1 according to the first embodiment in the point of including a soft material 31. This robot 3 realizes a floating mount by way of the soft material 31.

The soft material 31, for example, is formed in a ring shape from rubber or a sponge-like material, or a gel-like material, and is a softer material than the neck part 13 and cover 15. This soft material 31 is interposed between the neck part 13 and cover 15. The cover 15 is supported via the soft material 31 by the neck part 13.

According to such a robot 3, since the ring-shaped soft material 31 is interposed between the neck part 13 and cover 15, the front/rear, left/right, and oblique complex swinging becomes possible. As a result, it is possible to realize more human-like motion. In addition, since the soft material 31 absorbs external forces, it is possible to curb wasteful shaking of the cover 15. As a result, it is possible to realize more human-like motion.

Fourth Embodiment

Figure 10:
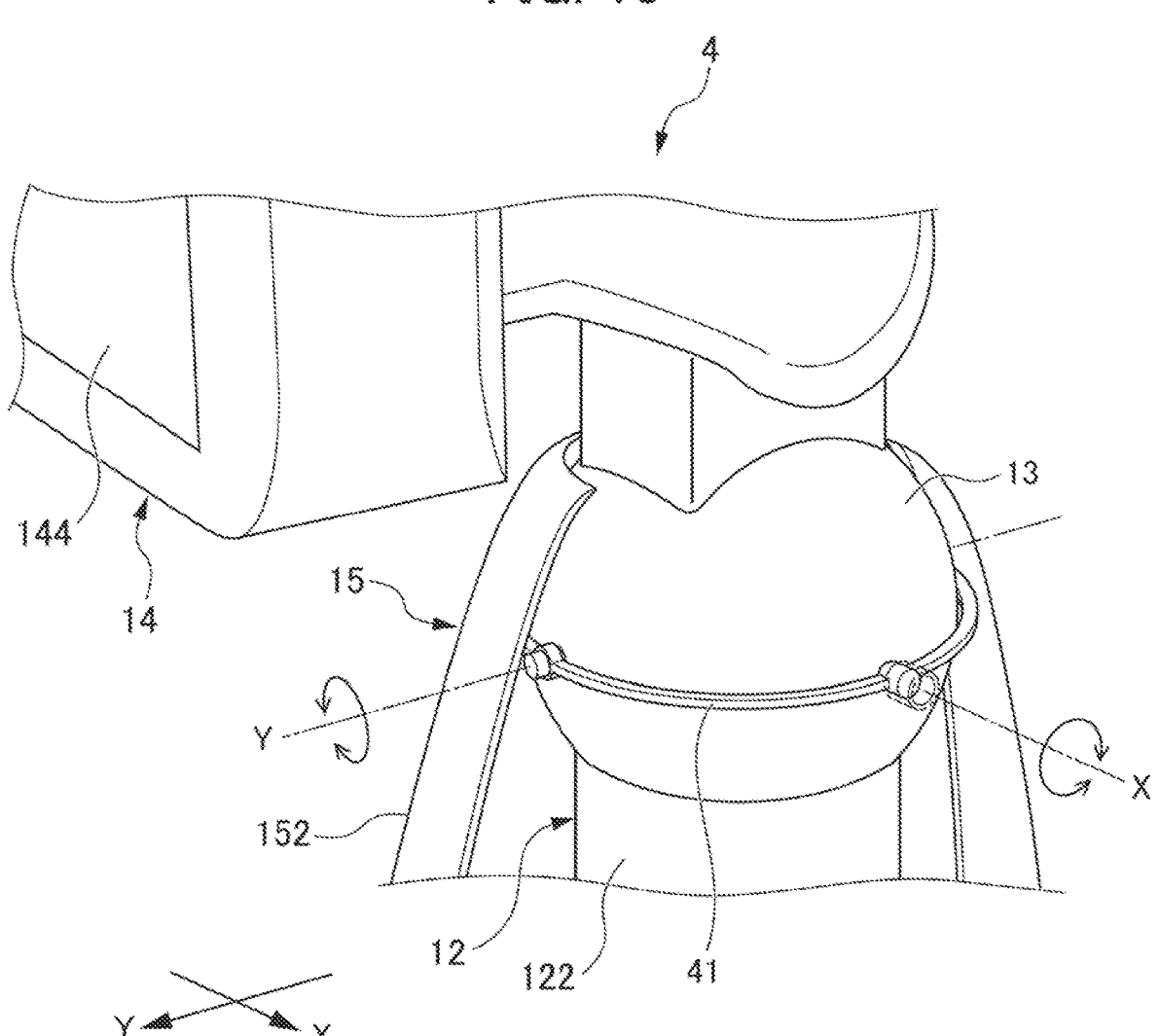
FIG. 10 is an enlarged perspective view showing principle parts of a robot according to a fourth embodiment of the present invention.

Next, the configuration of a robot 4 according to a fourth embodiment of the present invention will be explained using FIG. 10. FIG. 10 is an enlarged perspective view showing principle parts of the robot 4.

The robot 4 shown in FIG. 10 differs from the robot 1 according to the first embodiment in the point of including a ring stay 41.

The ring stay 41 is a two-axis rotational mechanism enabling swinging of the cover 15 relative to the neck part 13. More specifically, the ring stay 41 is provided around the neck part 13, and is attached to be rotatable around the Y axis relative to the neck part 13, and attaches the cover 15 to be rotatable around the X axis. The cover 15 is supported by the neck part 13 via the ring stay 41.

According to such a robot 4, since the cover 15 is supported via the ring stay 41 to the neck part 13, it is possible to smoothly swing the cover 15 with little friction relative to a case of the cover 15 being supported directly to the neck part 13. As a result, it is possible to realize more human-like motion.

Fifth Embodiment

Figure 11:
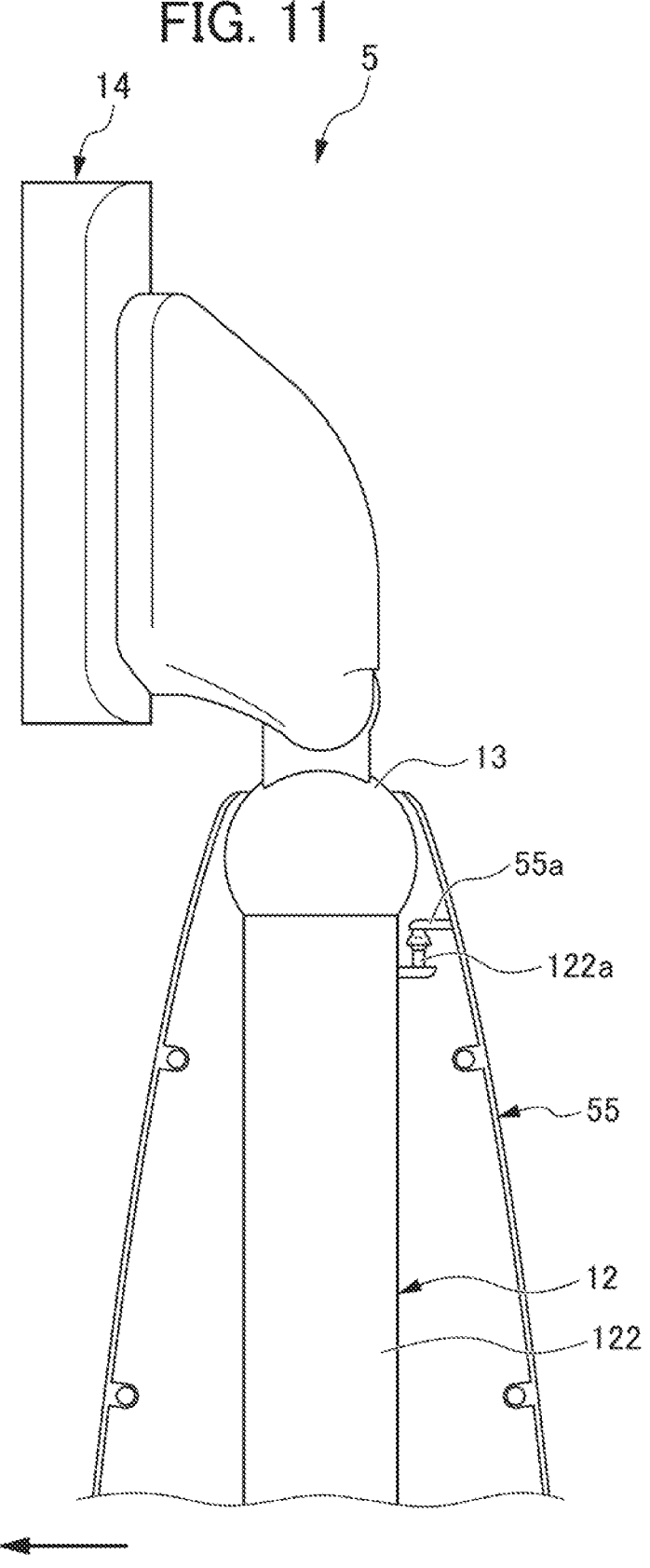
FIG. 11 is a side view showing a portion of a robot according to a fifth aspect of the present invention, and shows a state removing a left cover.

Next, the configuration of a robot 5 according to a fifth embodiment of the present invention will be explained using FIG. 11. FIG. 11 is a side view showing a portion of the robot 5, and shows a state removing a left cover (not shown).

The robot 5 shown in FIG. 11 differs from the robot 1 according to the first embodiment in the point of including a cover 55 in place of the cover 15. This robot 5 realizes a balancing toy-type of mount.

The cover 55 is made of resin, for example, and covers the torso part 12 so as to have a space between the torso part 12, and maintain a state in which the upper end and lower end do not contact with the torso part 12.

The torso part 12 has a support section 122a which supports the cover 55 laterally near the upper end of the torso upper part 122. The support section 122a is an L-shaped hook, and the leading end is formed in a ball shape. The cover 55 has a supported section 55a which fits with the support section 122a of the torso part 12. The supported section 55a is formed in a bowl shape corresponding to the ball-shaped support section 122a. This supported section 55a is provided at a position above the center of gravity of this cover 55 on the inner surface of the cover 55, and makes this cover 55 swingable as a fulcrum of this cover 55, by being placed on the support section 122a. It should be noted that the cover 55 may have a balance weight, so as to be the same as a robot 6 according to a sixth embodiment described later.

In addition, the robot 5 includes a concealing member 51. The concealing member 51, for example, is made of cloth, and hides a gap between the upper end of the cover 55 and the torso part 12, by being arranged around the neck part 13.

According to such a robot 5, motion imitating a human being becomes possible by swinging the cover 55. As a result, it is possible to realize human-like motion.

In addition, according to the robot 5, due to including the concealing member 51, it is possible to hide the gap between the upper end of the cover 55 and the torso part 12. As a result, it is possible to improve the design property.

Sixth Embodiment

Figure 12:
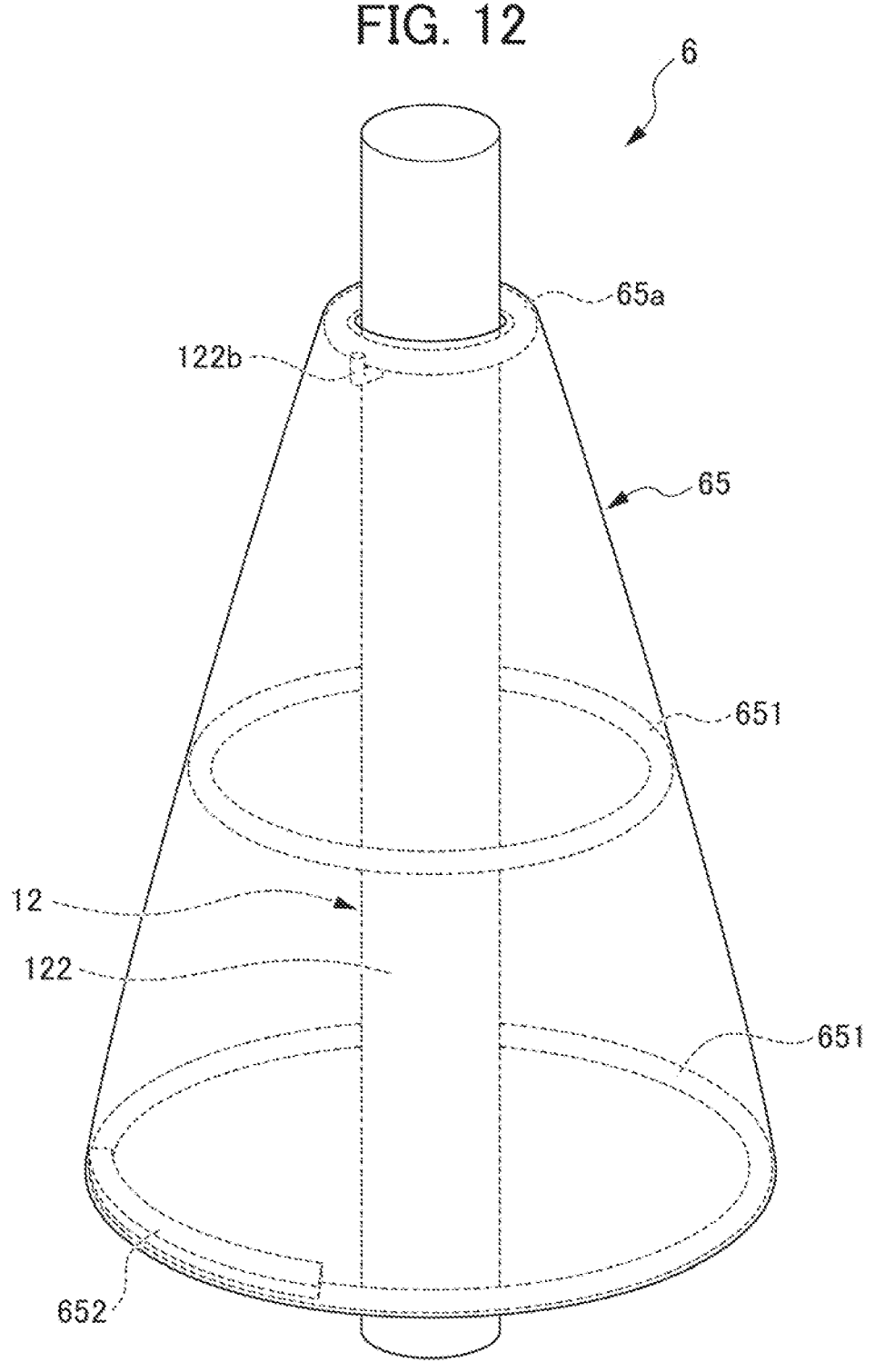
FIG. 12 is an enlarged perspective view showing a robot according to a sixth embodiment of the present invention.

Next, the configuration of a robot 6 according to a sixth embodiment of the present invention will be explained using FIG. 12. FIG. 12 is an enlarged perspective view showing the robot 6.

The robot 6 shown in FIG. 12 differs from the robot 1 according to the first embodiment in the point of including a cover 65 in place of the cover 15, the point of not including the first swing mechanism 16 and second swing mechanism 17, etc. This robot 6 realizes a support structure of a cover 65 which sways.

The cover 65, for example, is made of resin, and covers the torso part 12 so as to have a space between the torso part 12, and maintain a state in which the upper end and lower end do not contact with the torso part 12.

The torso part 12 has a support section 122b which supports the cover 65 laterally close to the upper end of the torso upper part 122. The support section 122b is an L-shaped hook. The cover 65 has a ring-shaped supported section 65a which is hooked to the support section 122b at an upper end inside of this cover 65. The supported section 65a is provided at a position above the center of gravity of the cover 65, and makes this cover 65 swingable as a fulcrum of this cover 65, by being placed on the support section 122b.

In addition, the cover 65 has a ring 651 and balance weight 652. The ring 651 is an appropriate weight arranged so as to be horizontal to the inner surface of the cover 65. The balance weight 652 is a weight for achieving balance which is attached to the ring 651. More specifically, the balance weight 652 is provided at a position lower than the center of gravity of the cover 65.

According to such a robot 6, due to having the balance weight 652, it is possible to prevent the cover 65 from tilting in the base posture.

Seventh Embodiment

Figure 13:
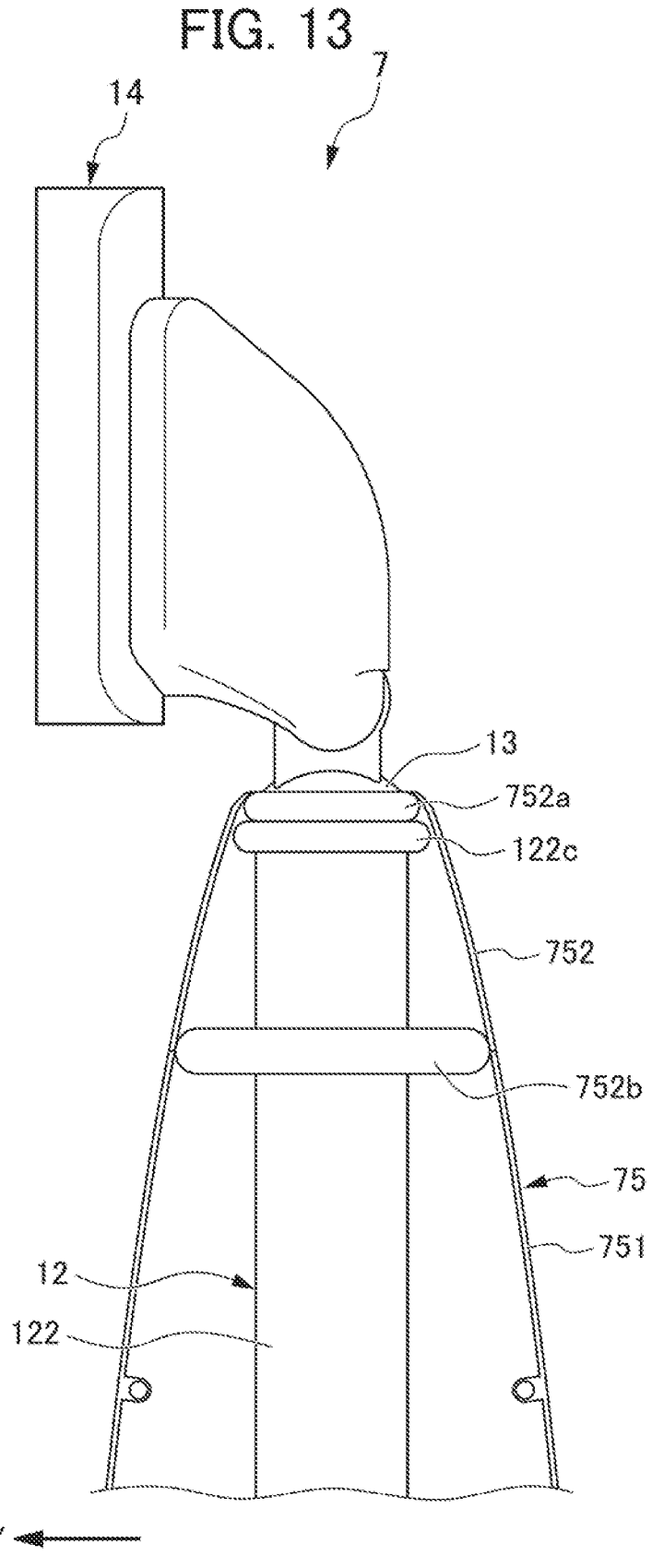
FIG. 13 is a side view showing a portion of a robot according to a seventh embodiment of the present invention, and shows a state removing a left cover.
Figure 14:
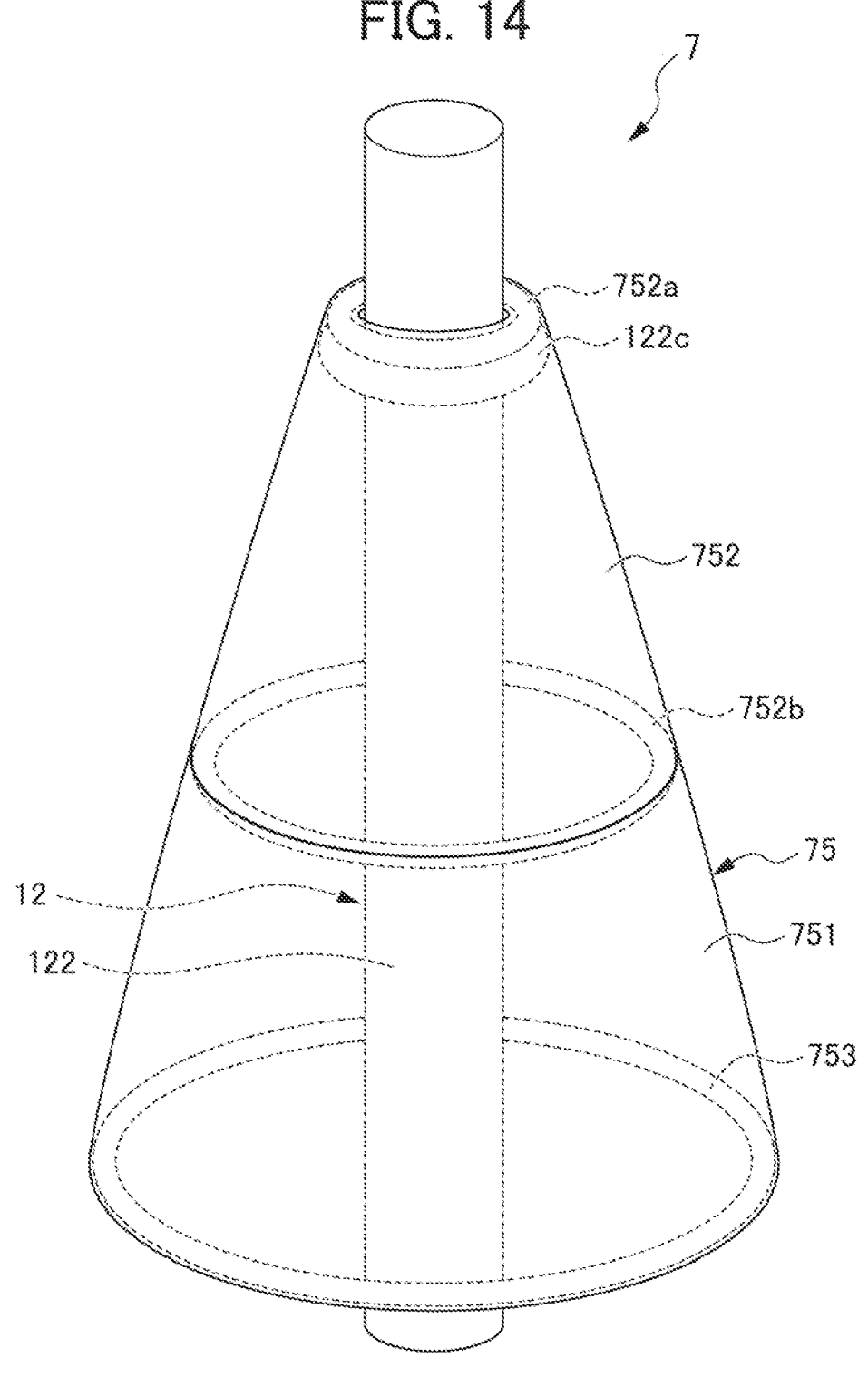
FIG. 14 is an enlarged perspective view showing the robot shown in FIG. 13.

Next, the configuration of a robot 7 according to a seventh embodiment of the present invention will be explained using FIG. 13 and FIG. 14. FIG. 13 is a side view showing a portion of the robot 7, and shows a state removing the left cover 151. FIG. 14 is an enlarged perspective view showing the robot 7.

The robot 7 shown in FIG. 13 and FIG. 14 differs from the robot 1 according to the first embodiment, in the point of including a cover 75 in place of the cover 15, the point of not including the first swing mechanism 16 and second swing mechanism 17, etc. This robot 7 realizes a structure of the cover 75 which sways, and realizes a stopper structure of the cover 75.

The torso part 12 has a ring-shaped stopper 122c which supports the cover 75 close to the upper end of the torso upper part 122. The cover 75 includes a cover main body 751, support body 752 and ring 753. The cover main body 751 is divisible into left and right so as to be the same as the cover 15. The support body 752, for example, is made of cloth, is formed in a cylinder shape, and the ring 752a hooked to the stopper 122c is sewn to an upper end, and a ring 752b connected to the cover main body 751 is sewn to the lower end. The ring 753 is a weight arranged so as to be horizontal at the inner surface of the cover 75.

According to such a robot 7, the weight of the ring 753 becomes inertia when moving, and the cover 75 tilts in the opposite direction to the moving direction. As a result, it is possible to realize human-like motion.

Eighth Embodiment

Figure 15:
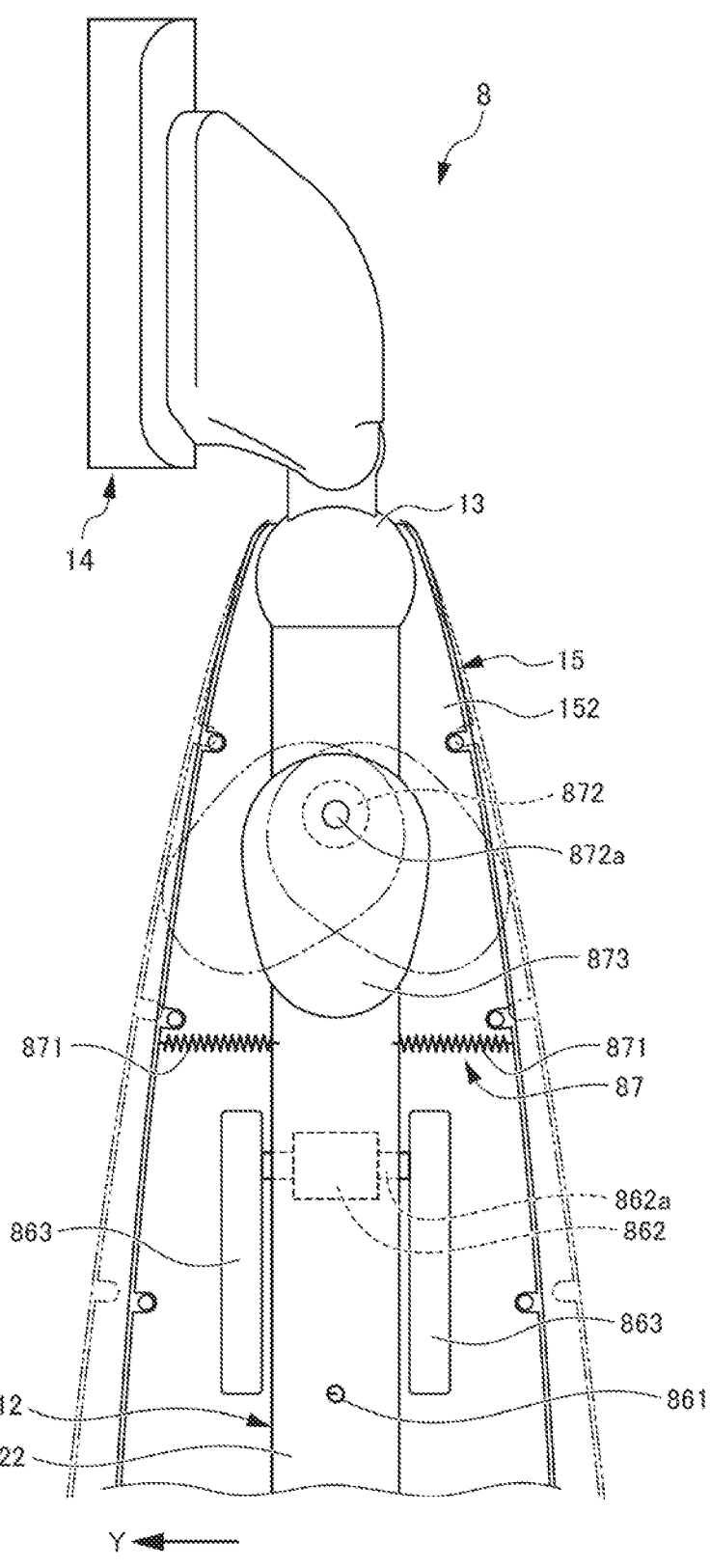
FIG. 15 is a side view showing a portion of a robot according to an eighth embodiment of the present invention, and shows a state removing a left cover.
Figure 16:
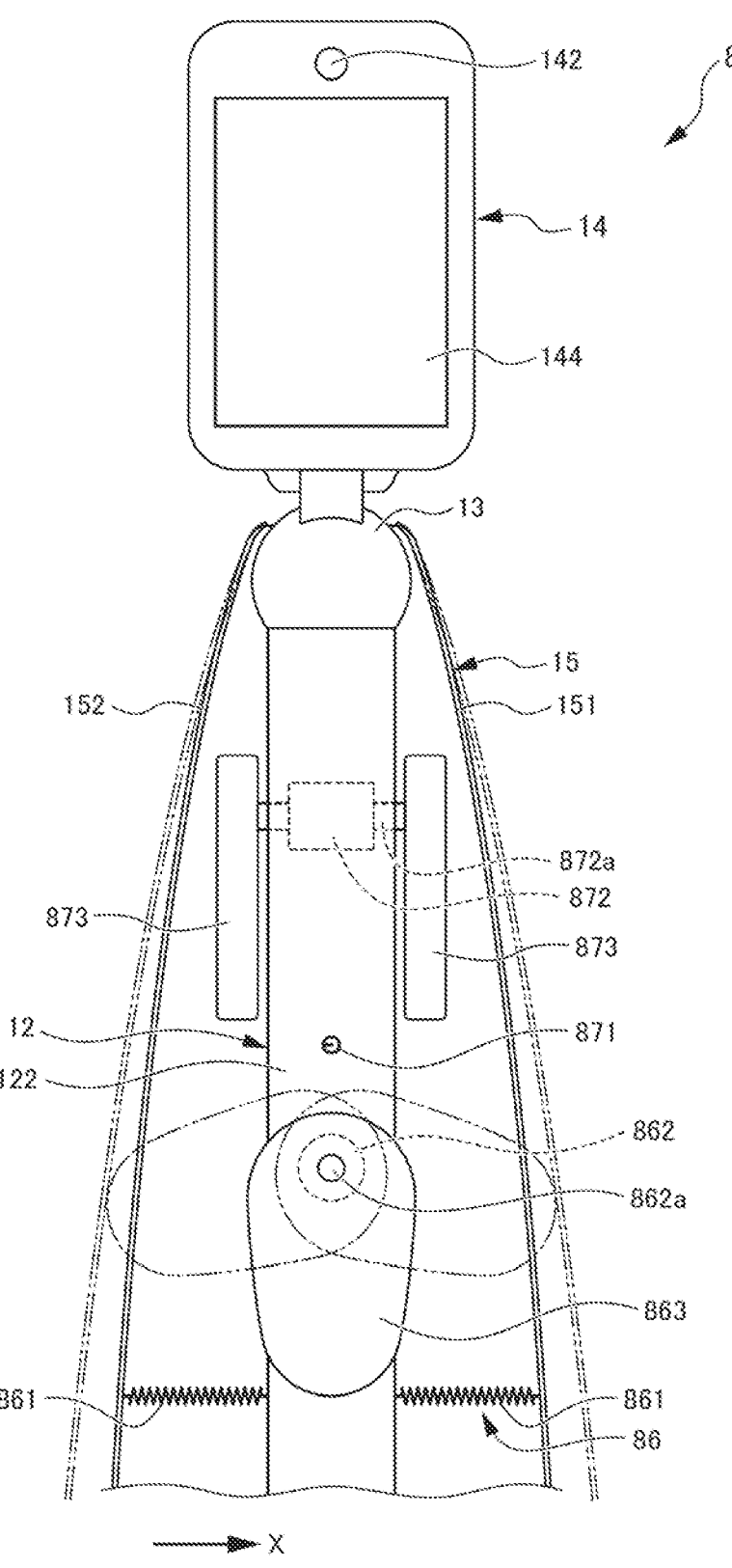
FIG. 16 is a front view showing a portion of the robot shown in FIG. 15, and shows by omitting a front half of the cover.

Next, the configuration of a robot 8 according to an eighth embodiment of the present invention will be explained using FIG. 15 and FIG. 16. FIG. 15 is a side view showing a portion of the robot 8, and shows a state removing the left cover 151. FIG. 16 is a front view showing a portion of the robot 8, and shows by omitting the front half of the cover 15.

The robot 8 shown in FIG. 15 and FIG. 16 differs from the robot 1 according to the first embodiment, in the point of including a first swing mechanism 86 and second swing mechanism 87 in place of the first swing mechanism 16 and second swing mechanism 17. This robot 8 realizes swinging of the cover 15 by a pair of first cams 863 and a pair of second cams 873.

The first swing mechanism 86 is a mechanism which swings the cover 15 in the left/right direction. More specifically, the first swing mechanism 86 includes a first coil spring 861, first motor 862, pair of first cams 863, etc.

The first coil spring 861 is an elastic member connecting the torso part 12 and cover 15, with one end connected to the torso upper part 122 of the torso part 12, and the other end detachably connected to the cover 15. This first coil spring 861 oscillates in the horizontal X-axis direction (left/right direction, first-axis direction).

The first motor 862 serves as a power source oscillating the first coil spring 861. This first motor 862 is fixed so as to penetrate the torso upper part 122 of the torso part 12.

The pair of first cams 863 is a power transmission mechanism which transmits the motive power of the first motor 862 to the cover 15, and is attached to both ends of a shaft 862a of the first motor 862. This first cam 863 transmits the motive power of the first motor 862 to the cover 15, by rotating together with the first motor 862.

The second swing mechanism 87 is a mechanism swinging the cover 15 in the left/right direction. More specifically, the second swing mechanism 87 includes a second coil spring 871, second motor 872, pair of second cams 873, etc.

The second coil spring 871 is an elastic member connecting the torso part 12 and cover 15, with one end being connected to the torso upper part 122 of the torso part 12, and the other end being detachably connected to the cover 15. This second coil spring 871 oscillates in the horizontal Y-axis direction (front/rear direction, second-axis direction) which is orthogonal to the X-axis direction.

The second motor 872 serves as a power source that oscillates the second coil spring 871. This second motor 872 is fixed so as to penetrate the torso upper part 122 of the torso part 12.

The pair of second cams 873 is a power transmission mechanism which transmits the motive power of the second motor 872 to the cover 15, and is attached to both ends of a shaft 872a of the second motor 872. This second cam 873 transmits the motive power of the second motor 872 to the cover 15, by rotating together with the second motor 872.

According to such a robot 8, it is possible to transmit the motive power of the first motor 862 and second motor 872 to the cover 15 with a simple structure. In other words, it is possible to swing the cover 15 with a simple structure.

Ninth Embodiment

Figure 17:
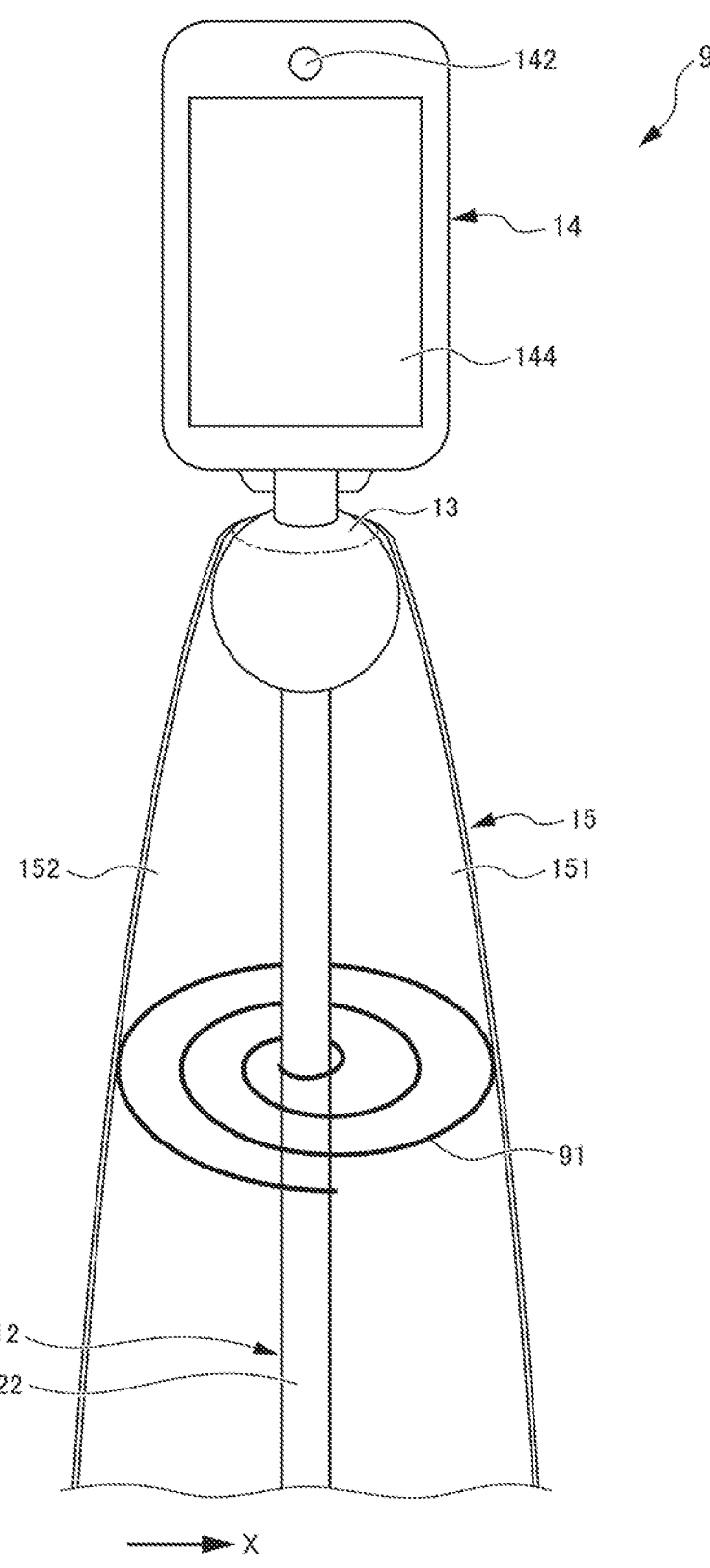
FIG. 17 is an external perspective view showing a portion of a robot according to a ninth embodiment of the present invention.

Next, the configuration of a robot 9 according to a ninth embodiment of the present invention will be explained using FIG. 17. FIG. 17 is an external perspective view showing a portion of the robot 9.

The robot 9 shown in FIG. 17 differs from the robot 1 according to the first embodiment in the point of including a spiral spring 91 in place of the first swing mechanism 16 and second swing mechanism 17. This robot 9 realizes the support structure of the cover 15 which sways.

The spiral spring 91 is an elastic member connecting the torso part 12 and cover 15. This spiral spring 91 has one end connected to the torso upper part 122, and the other end connected to the cover 15.

According to such a robot 9, since the elastic member connecting the torso part 12 and cover 15 is the spiral spring 91, the front/rear, left/right, and oblique complex swinging becomes possible. As a result, it is possible to realize more human-like motion.

Tenth Embodiment

Figure 18:
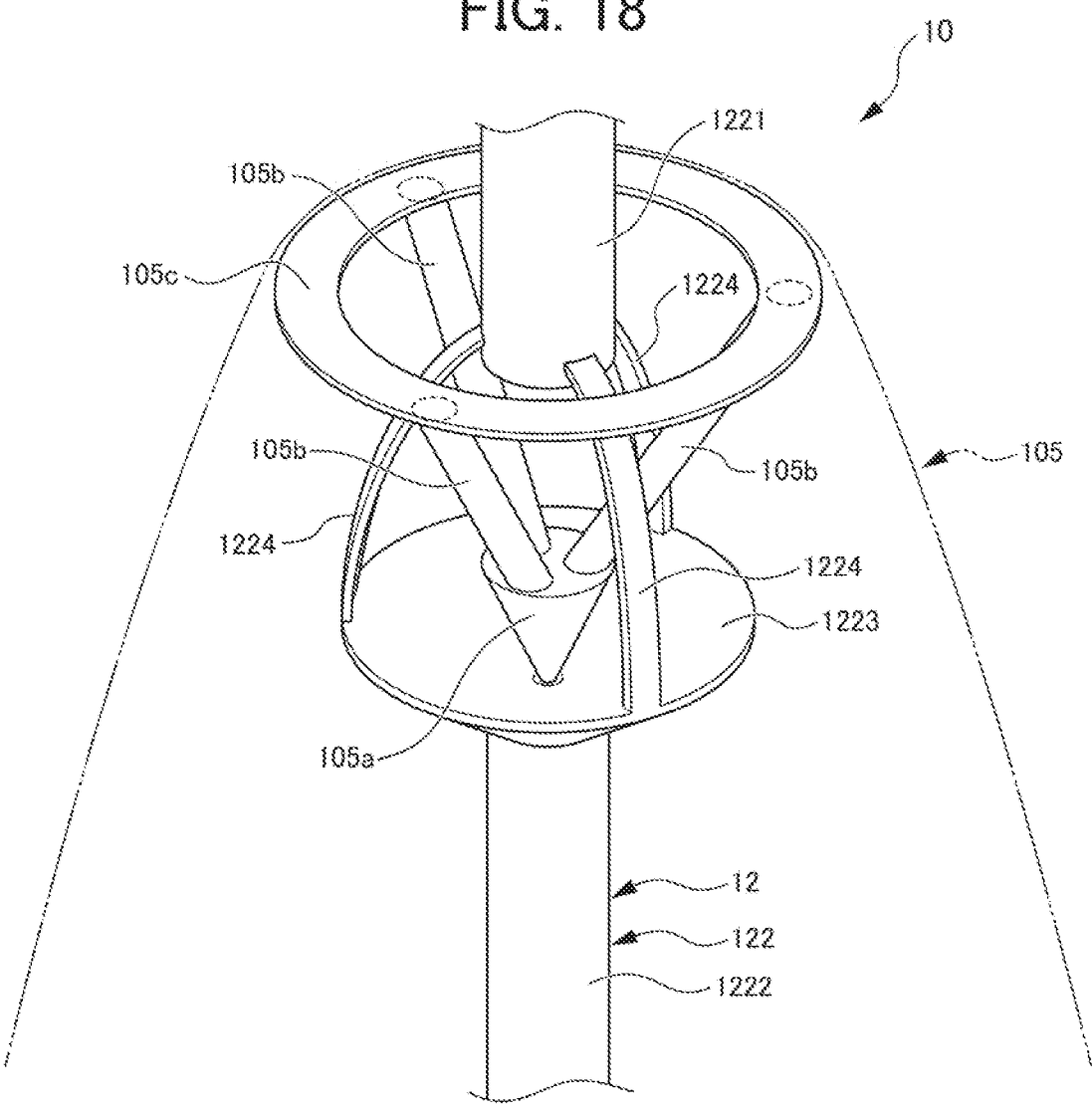
FIG. 18 is a perspective view showing inside of a robot according to a tenth embodiment of the present invention.

Next, the configuration of a robot 10 according to a tenth embodiment of the present invention will be explained using FIG. 18. FIG. 18 is a perspective view showing the inside of the robot 10.

The robot 10 shown in FIG. 18 differs from the robot 1 according to the first embodiment in the point of including a cover 105 in place of the cover 15, etc. This robot 10 realizes a balancing toy-type of mount.

The cover 105, for example, is made of resin, and covers the torso part 12 so as to have a space between the torso part 12, and maintain a state in which the upper end and lower end do not contact with the torso part 12.

The torso upper part 122 of the torso part 12 includes a pair of upper and lower vertical shafts 1221, 1222, a support section 1223, and connecting member 1224. The pair of upper and lower vertical shafts 1221, 1222 are arranged so as to have a space between the two, and are connected to each other by the connecting member 1224. The support section 1223 is a pedestal supporting the cover 105. The connecting member 1224 connects this pair of upper and lower vertical shafts 1221, 1222 to each other so as to have a space between the pair of upper and lower vertical shafts 1221, 1222.

The cover 105 has a supported section 105a placed on the support section 1223, a connecting member 105b which connects this supported section 105a with the inner surface of the cover 105, and a ring 105c interposed between this connecting member 105b and the cover 105. The supported section 105a is provided at a position above the center of gravity of the cover 105, and makes this cover 105 swingable as a fulcrum of this cover 105, by being placed on the support section 1223.

According to such a robot 10, since the support section 1223 and supported section 105a are positioned coaxially with the pair of upper and lower vertical shafts 1221, 1222, it is possible to prevent the cover 105 from tilting in the base posture.

Eleventh Embodiment

Figure 19:
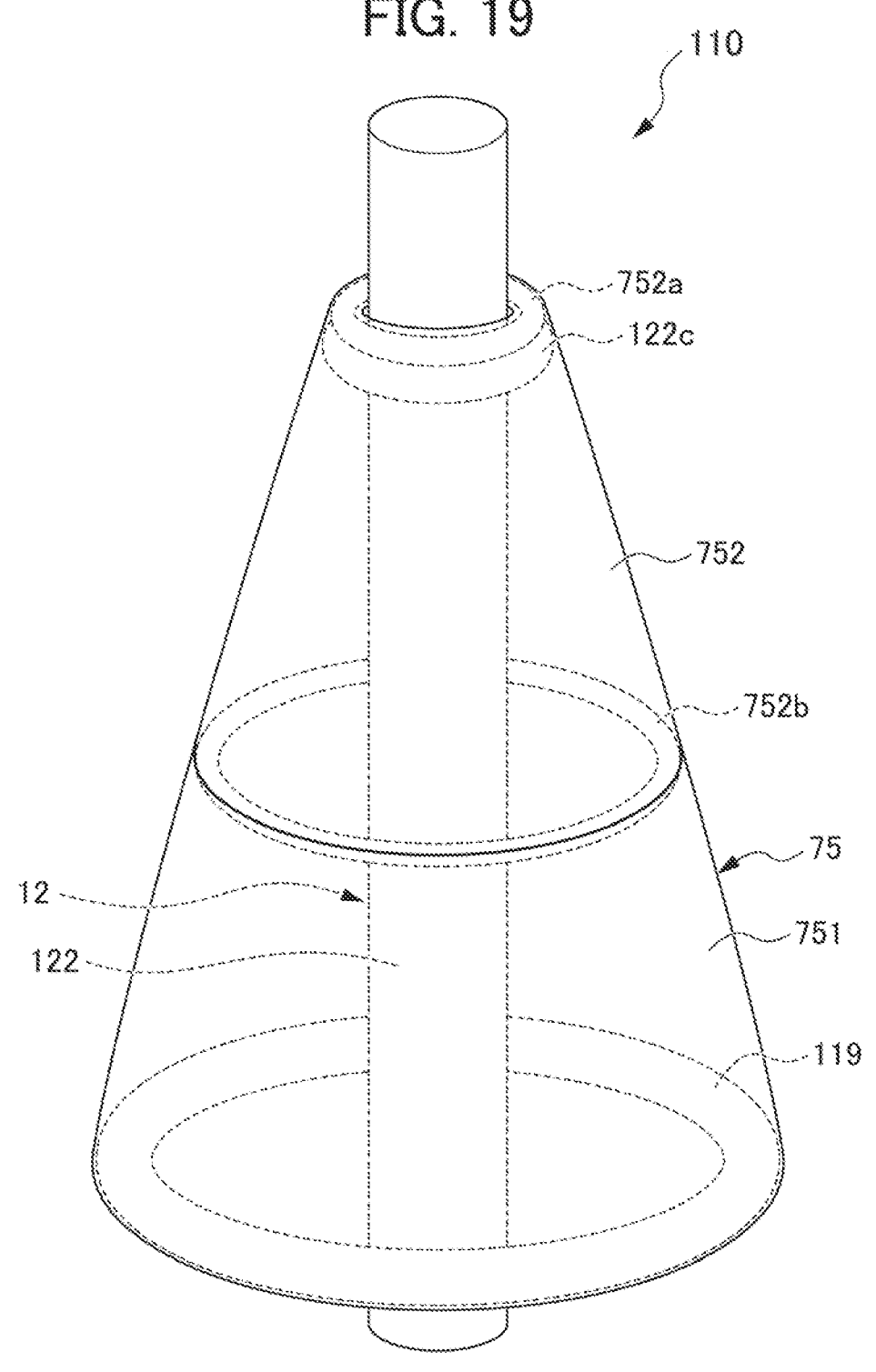
FIG. 19 is an enlarged perspective view showing a robot according to an eleventh embodiment of the present invention.

Next, the configuration of a robot 110 according to an eleventh embodiment of the present invention will be explained using FIG. 19. FIG. 19 is an enlarged perspective view showing the robot 110.

The robot 110 shown in FIG. 19 provides an elastic member 119 to the robot 7 according to the seventh embodiment, and other configurations thereof are the same as the robot 7 according to the seventh embodiment. It should be noted that the configurations including this elastic member 119 are applicable to robots according to other embodiments where appropriate.

As shown in FIG. 19, the elastic member 119 is arranged on the inside of the cover 15, and is arranged so as not to contact the cover 15 in a state in which the cover 15 is not swinging. In addition, the elastic member 119 is arranged on an inner wall surface of the cover 15 at the lowest end part of the cover 15, and is arranged along the circumferential direction of the cover 15. The elastic member 119 is a ring-shaped elastic member, for example, is configured by a sponge-like elastic member.

The cross-sectional shape of the elastic member 119, other than being a round shape such as a perfect circle, may be a triangular shape having apexes at the inner side (side of torso part 12), or may be a rectangular shape. Thereamong, in the case of the cross-sectional shape being a triangular shape, since the ease of deformation (fragility) differs between the leading end side of the elastic member 119 (torso part 12 side) and base end side (outer circumferential side of cover 15), the cover 15 can be made to swing according to the magnitude of acceleration, and it is possible to realize more human-like motion.

According to such a robot 110, since the elastic member 119 is arranged inside of the cover 15 and does not contact the cover 15 in a state in which the cover 15 is not swinging, it is possible to realize more human-like motion of the cover 15, by the elastic member 119 contacting the cover 15 only when the cover 15 swings.

In addition, according to the robot 110, since the elastic member 119 is arranged along the circumferential direction of the cover 15, it is possible to more reliably realize human-like motion by the swinging of the cover 15.

In addition, according to the robot 110, since the elastic member 119 is arranged at the lowest end part of the cover 15, it is possible to more greatly swing the cover 15, and thus possible to more reliably realize human-like motion.

Twelfth Embodiment

Figure 20:
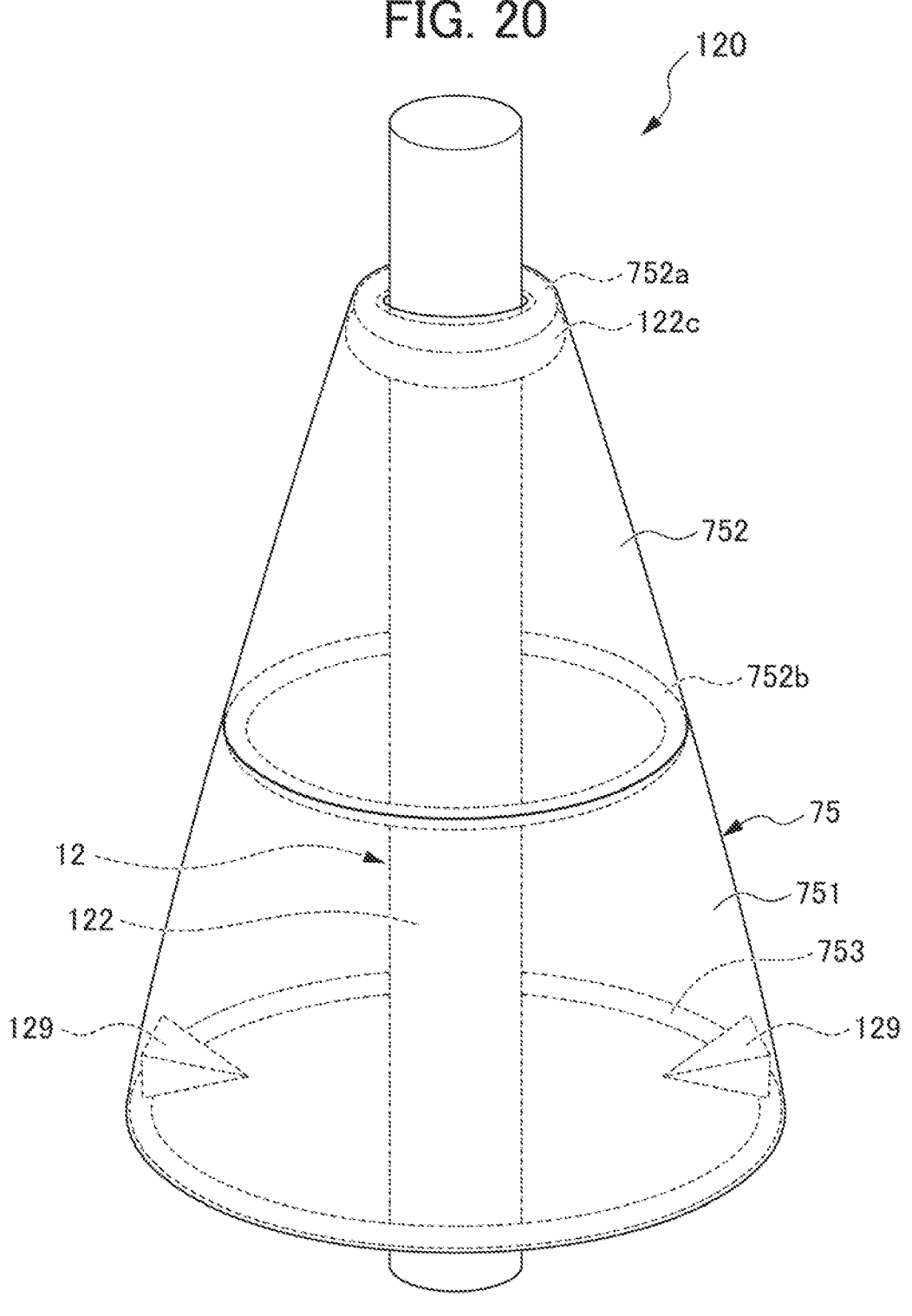
FIG. 20 is an enlarged perspective view showing a robot according to an twelfth embodiment of the present invention.

Next, the configuration of a robot 120 according to a twelfth embodiment of the present invention will be explained using FIG. 20. FIG. 20 is an enlarged perspective view showing the robot 120.

The robot 120 shown in FIG. 20 was achieved by changing the configuration of an elastic member 129 in the robot 110 according to the eleventh embodiment, and other configurations thereof are the same as the robot 110 according to the eleventh embodiment. It should be noted that the configurations including this elastic member 129 are applicable to robots according to other embodiments where appropriate.

As shown in FIG. 20, the elastic member 129 is a triangular pyramid elastic member. The elastic member 119 is arranged on an inner wall surface of the cover 15 at a lowest end part of the cover 15, and a plurality are arranged discontinuously along the circumferential direction of the cover 15. Only two of the elastic members 129 are shown in FIG. 20 for convenience; however, the number thereof and the arrangement interval in the circumferential direction are set as appropriate. The elastic member 129 is configured by a sponge-like elastic member, for example.

The elastic member 129, similarly to the elastic member 119, is arranged on the inside of the cover 15, and is arranged so as not to contact the cover 15 in a state in which the cover 15 is not swinging. In addition, similarly to the case of the cross-sectional shape of the elastic member 119 being triangular, since the cross-sectional shape is triangular, the cover 15 can be made to swing according to the magnitude of acceleration, and it is possible to realize more human-like motion.

According to such a robot 120, since a plurality of the elastic members 129 are arranged discontinuously inside of the cover 15, it is possible to more reliably realize human-like motion by the swinging of the cover 15.

Thirteenth Embodiment

Figure 21:
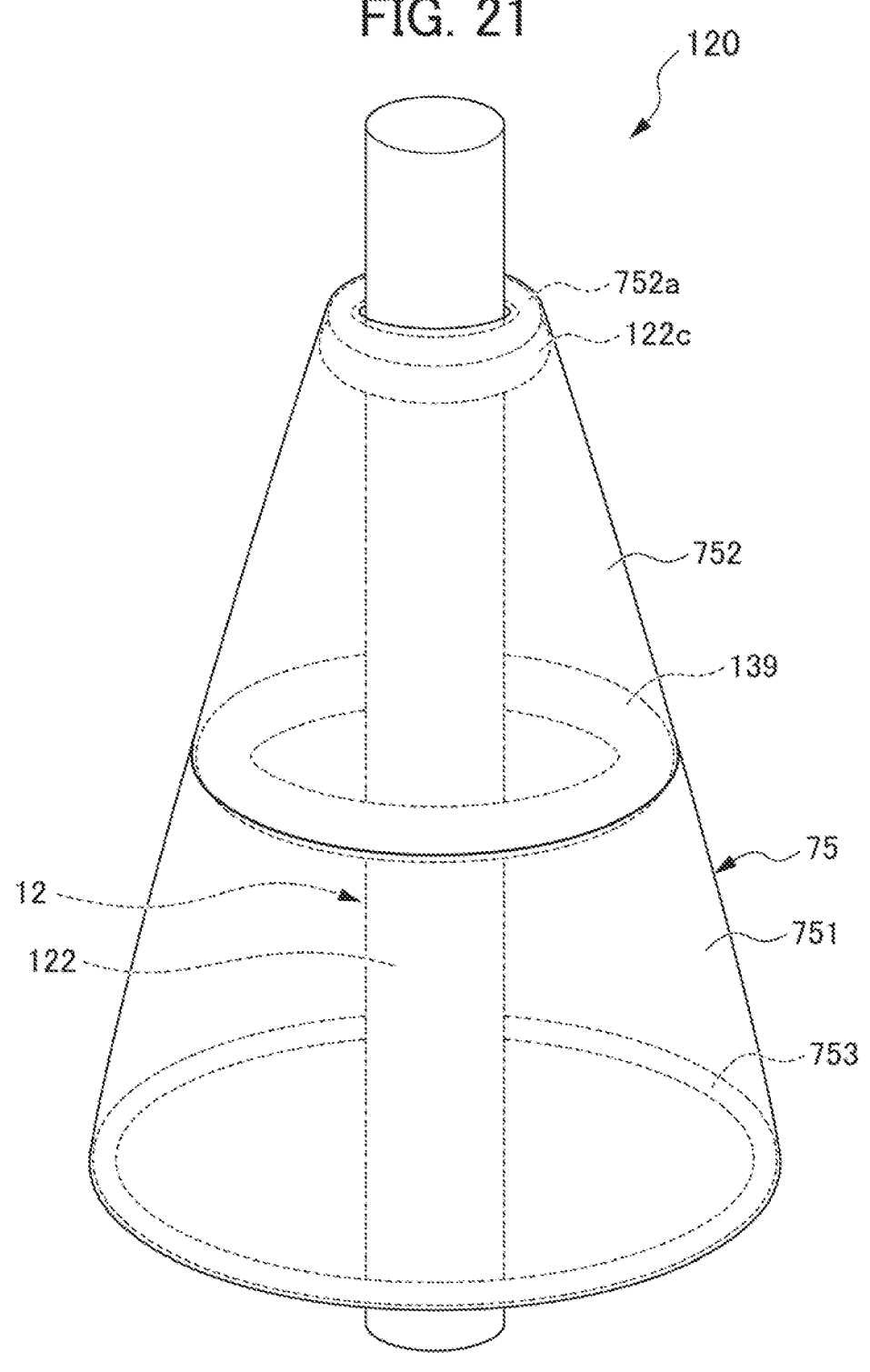
FIG. 21 is an enlarged perspective view showing a robot according to a thirteenth embodiment of the present invention.

Next, the configuration of a robot 130 according to a thirteenth embodiment of the present invention will be explained using FIG. 21. FIG. 21 is an enlarged perspective view showing the robot 130.

The robot 130 shown in FIG. 21 differs in the position of the elastic member 139 relative to the robot 110 according to the eleventh embodiment, and other configurations thereof are the same as the robot 110 according to the eleventh embodiment. It should be noted that the configurations including this elastic member 139 are applicable to robots according to other embodiments where appropriate.

As shown in FIG. 21, the elastic member 139 has smaller diameter compared to the elastic member 119, and is arranged at substantially a central part in the up/down direction of the cover 15. According to such a robot 130, it is possible to more reliably realize human-like motion by the swinging of the cover 15.

Fourteenth Embodiment

Figure 22:
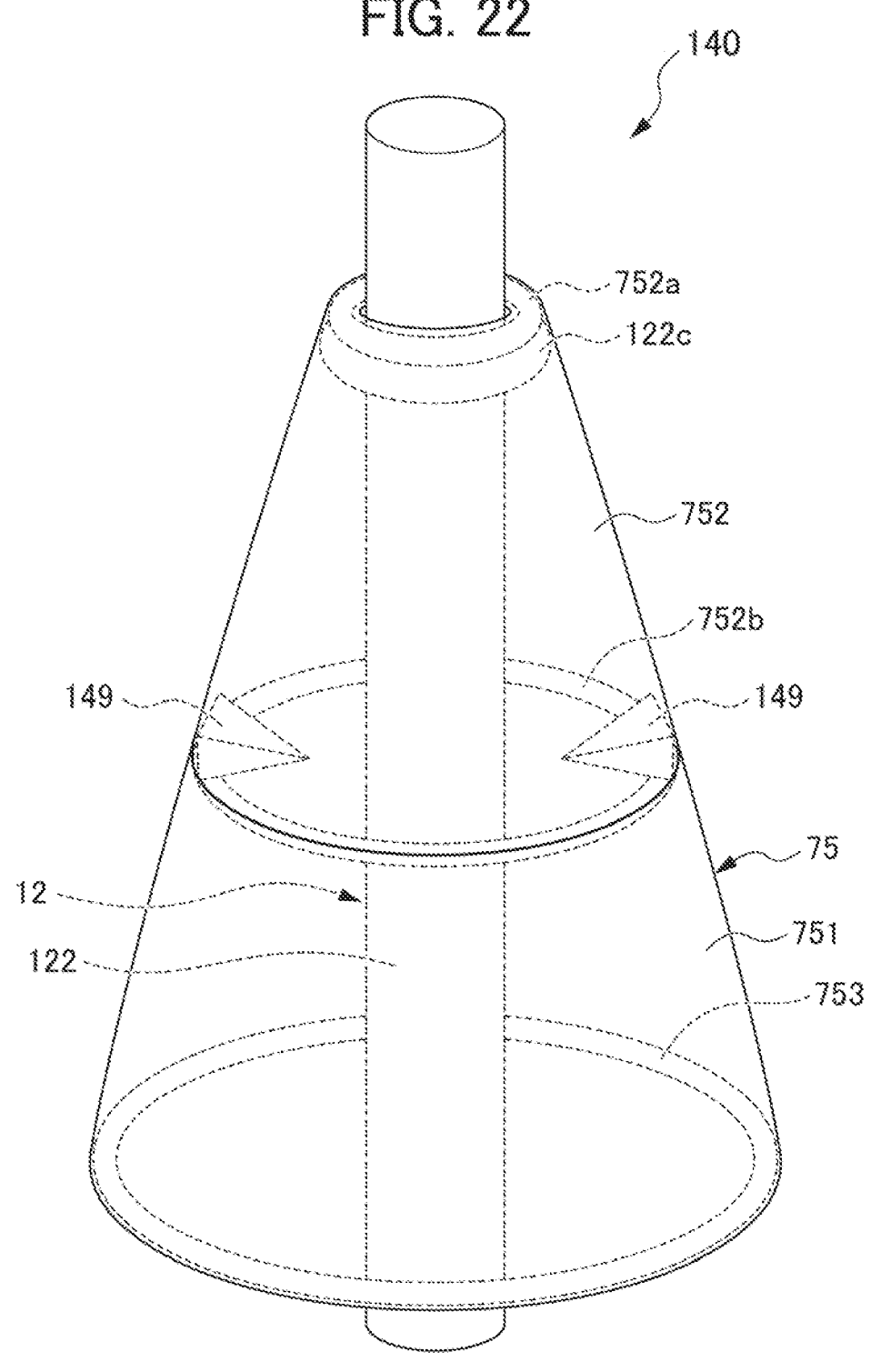
FIG. 22 is an enlarged perspective view showing a robot according to a fourteenth embodiment of the present invention.

Next, the configuration of a robot 140 according to a fourteenth embodiment of the present invention will be explained using FIG. 22. FIG. 22 is an enlarged perspective view showing the robot 140.

The robot 140 shown in FIG. 22 differs in the position of the elastic member 149 relative to the robot 120 according to the twelfth embodiment, and the other configurations thereof are the same as the robot 120 according to the twelfth embodiment. It should be noted that the configurations including this elastic member 149 are applicable to robots according to other embodiments where appropriate.

As shown in FIG. 22, the elastic member 149 is arranged at a substantially central part in the up/down direction of the cover 15. According to such a robot 140, it is possible to more reliably realize human-like motion by the swinging of the cover 15.

Fifteenth Embodiment

Figure 23:
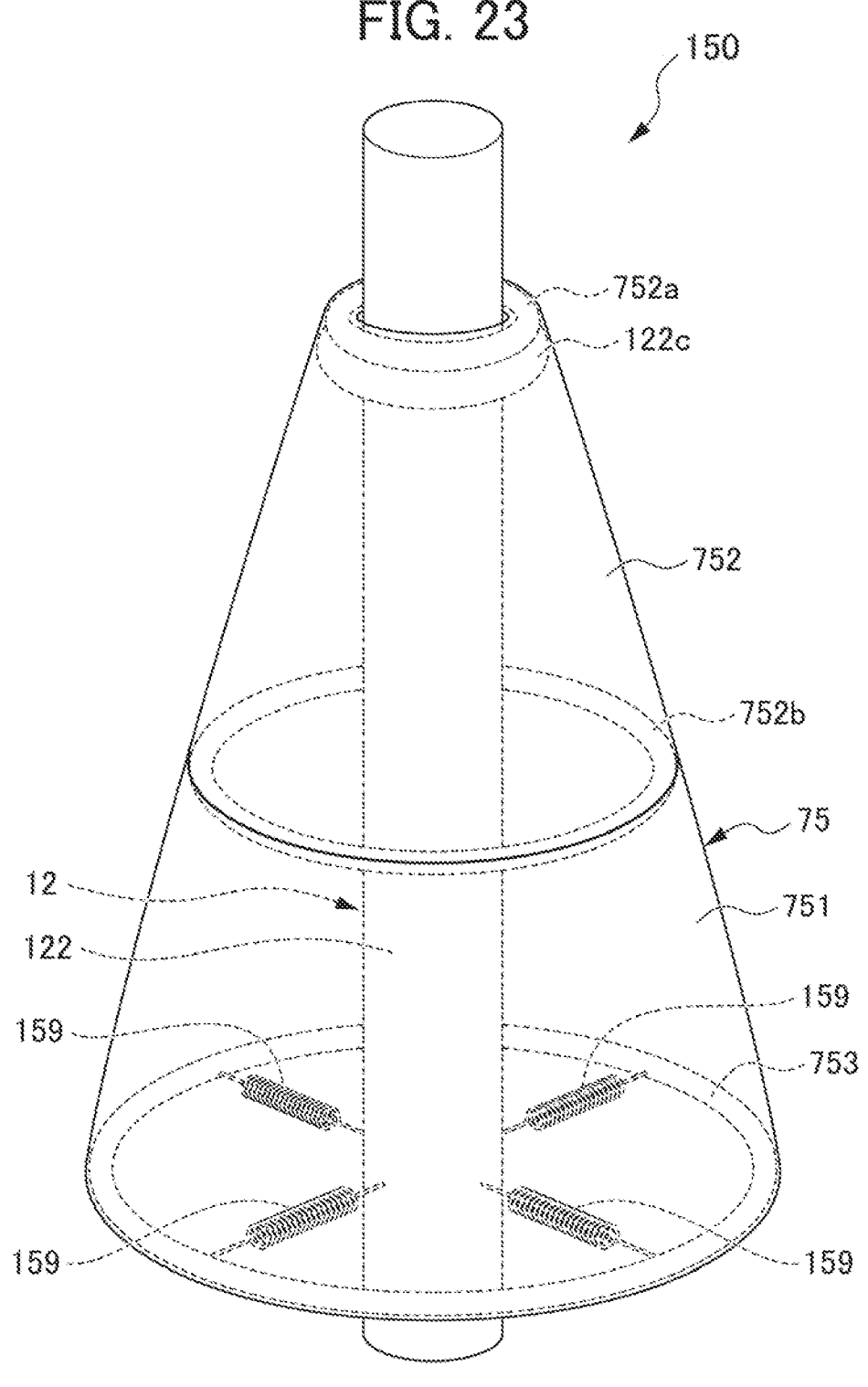
FIG. 23 is an enlarged perspective view showing a robot according to a fifteenth embodiment of the present invention.

Next, the configuration of a robot 150 according to a fifteenth embodiment of the present invention will be explained using FIG. 23. FIG. 23 is an enlarged perspective view showing the robot 150.

The robot 150 shown in FIG. 23 provides an elastic member 159 to the robot 7 according to the seventh embodiment, and other configurations thereof are the same as the robot 7 according to the seventh embodiment. It should be noted that the configurations including this elastic member 159 are applicable to robots according to other embodiments where appropriate.

As shown in FIG. 23, the elastic member 159 is a coil spring. The elastic member 159 is connected to the inner wall surface of the cover 15 and the torso part 12, at the lowest end part of the cover 15. As shown in FIG. 23, for example, four coil springs are arranged at equal intervals in the circumferential direction as the elastic member 159. However, the number thereof and arrangement interval in the circumferential direction are not limited, and are set as appropriate.

According to such a robot 150, it is possible to swing the cover 15 by way of the elastic member 159, and thus possible to more reliably realize human-like motion.

Sixteenth Embodiment

Figure 24:
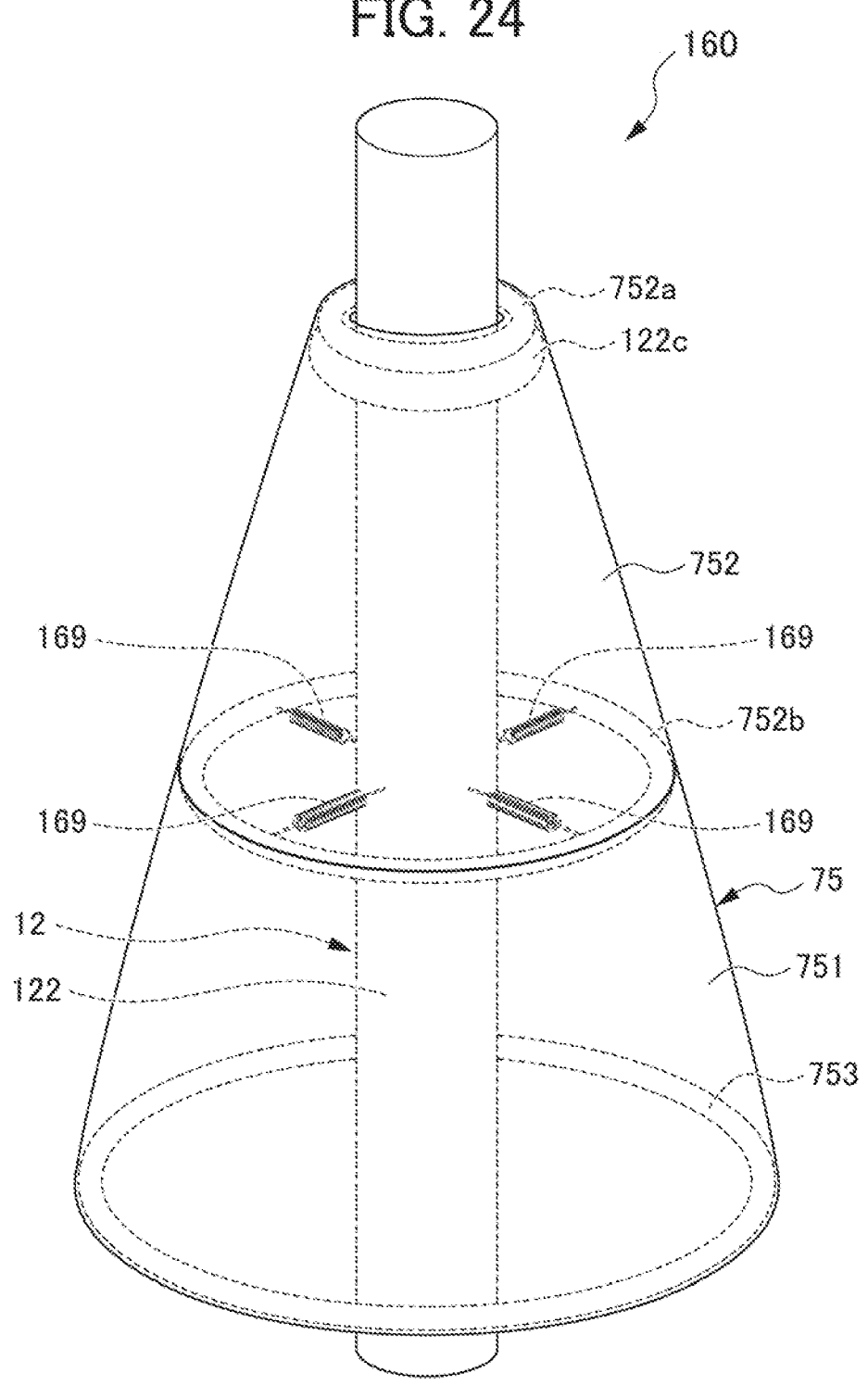
FIG. 24 is an enlarged perspective view showing a robot according to a sixteenth embodiment of the present invention.

Next, the configuration of a robot 160 according to a sixteenth embodiment of the present invention will be explained using FIG. 24. FIG. 24 is an enlarged perspective view showing the robot 160.

The robot 160 shown in FIG. 24 differs in the position of an elastic member 169 relative to the robot 150 according to the fifteenth embodiment, and other configurations thereof are the same as the robot 150 according to the fifteenth embodiment. It should be noted that the configurations including this elastic member 169 are applicable to robots according to other embodiments where appropriate.

As shown in FIG. 24, the elastic member 169 is arranged at a substantially central part in the up/down direction of the cover 15. According to such a robot 160, it is possible to swing the cover 15 by way of the elastic member 169, and thus possible to more reliably realize human-like motion.

It should be noted that the present invention is not to be limited to the above-mentioned respective embodiments, and that modifications, improvements, etc. of a scope which can achieve the object of the present invention are encompassed by the present invention. For example, the configuration of each embodiment, and each modified example may be applied to other embodiments within the scope of possibility.

Alternatively, although a case of the head part 14 possessing the controller 141, transmitter 146 and receiver 147 is explained as an example in each of the above-mentioned embodiments, the present invention is not to be limited thereto, and may be possessed by the drive unit 11 or torso part 12.

Alternatively, in each of the above embodiments, a case of the tilt mechanism 148 tilting the head part 14 is explained as an example; however, the present invention is not limited thereto, and may tilt the torso part 12.

Alternatively, in each of the above embodiments, a case of the tilt mechanism 148 tilting the head part 14 is explained as an example; however, the present invention is not limited thereto, and it may be configured to rotate the head part 14 left and right by including a rotation mechanism in addition to the tilt mechanism 148. In this case, upon turning left, left rotation of the head part 14 may be started together with when starting oscillation of the cover 15, 55, 65, 75, 105. In the same way, upon turning right, right rotation of the head part 14 may be started together with when starting oscillation of the cover 15, 55, 65, 75, 105.

Figure 25:
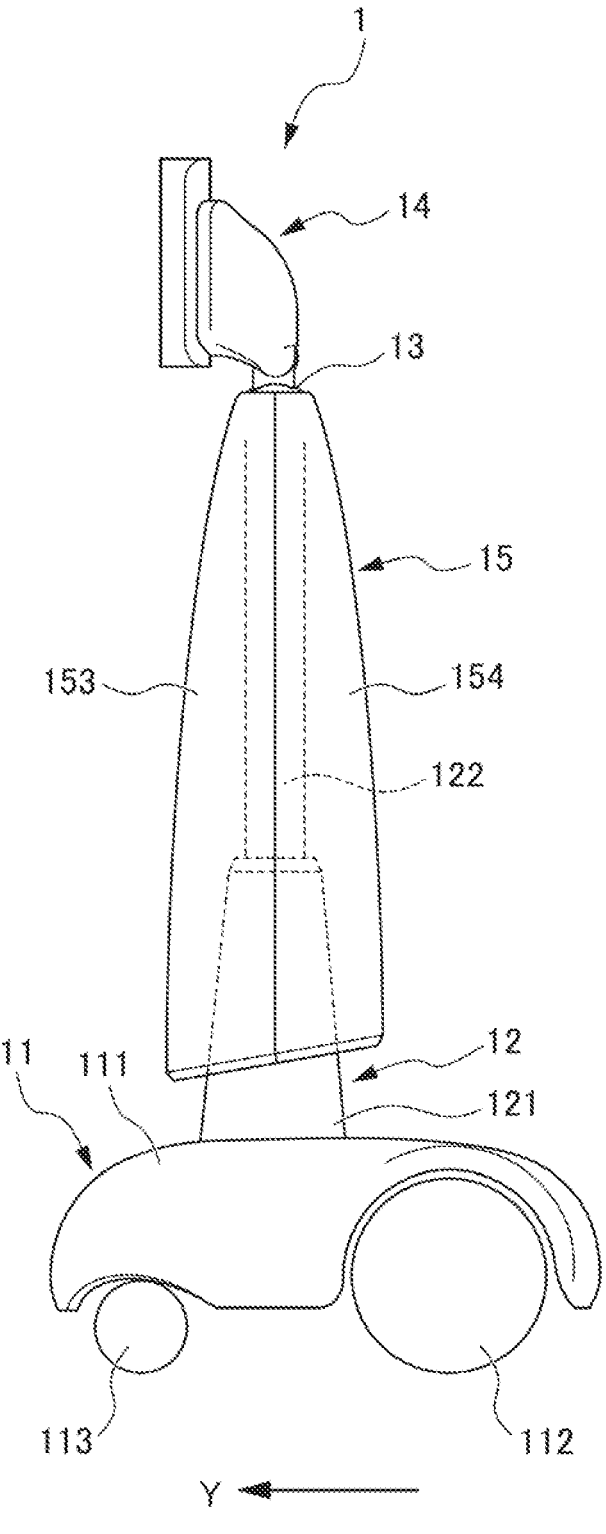
FIG. 25 is a side view showing a modified example of the robot according to the first embodiment of the present invention.

Alternatively, in each of the above embodiments, although a case of the cover 15, 55, 65, 75, 105 being divisible into left and right was explained as an example, the present invention is not limited thereto, and may be divisible into front and rear, as shown in FIG. 25, for example. FIG. 25 is a side view showing a modified example of the robot 1. In this modified example, the cover 15 is divisible into front and rear, and includes a front cover 153 and rear cover 154. It should be noted that this configuration is applicable to all of the above respective embodiments.

As mentioned above, the cover 15 is at a site corresponding to the torso of a human being, and due to having a design property and being detachable and replaceable, is a site corresponding to clothing. For this reason, in the case of the cover 15 being divisible into front and rear as in the modified example shown in FIG. 25, when viewing the robot 1 from the front and when viewing from the rear, it is possible to establish as a robot of different designs.

In the modified example shown in FIG. 25, the front cover 153 constitutes a front half of the cover 15. This front cover

153 has a plurality of holes (not shown) spaced apart front each other along an edge which abuts the rear cover 154, and arranges magnets (not shown) in these holes.

In addition, the rear cover 154 constitutes a rear half of the cover 15. This rear cover 154 has a plurality of holes (not shown) spaced apart from each other along the edge abutting the front cover 153, and arranges magnets (not shown) so as to project from these holes.

In this way, the front cover 153 has a magnet dowel recess, and the rear cover 154 has a magnet dowel convex. According to such a configuration, by engaging the magnets of the rear cover 154 into the holes of the front cover 153 and affixing to the magnets, the front cover 153 and rear cover 154 merge to constitute the cover 15. As a result, the cover 15 becomes front/rear divisible, and detachable by the strong magnet.

Alternatively, in each of the above embodiments, a case of the cover 15, 55, 65, 75, 105 being made of resin has been explained as an example; however, the present invention is not limited thereto, and the material of the cover 15, 55, 65, 75, 105 may be a material of a hardness such as wood, stiff paper or metal, may be a soft fabric or a material made into a structure which malleably moves by a hard material such as metal made into fine wire form and established in a knit structure, or may be a structure made by combining soft material and hard material. The cover 15, 55, 65, 75, 105 can attach an arm or a light such as LED, by holes being provided in hard portions.

Alternatively, in the first to fifth and tenth embodiments, although a case of providing the first swing mechanism 16 and second swing mechanism 17 has been explained as an example, the present invention is not limited thereto, and may be a configuration not including the first swing mechanism 16 and second swing mechanism 17. In this case, it may be configured so as to provide an elastic member such as a coil spring separately, and cause the torso part 12 and cover 15, 55 to contact.

Alternatively, in the first to fifth and tenth embodiments, although a case of the first swing mechanism 16 including the first coil spring 161 as an elastic member, and the second swing mechanism 17 including the second coil spring 171 as an elastic member has been explained as an example, the present invention is not limited thereto, and may be a configuration including an elastic member such as a spiral spring or elastic cord so as to be the same as the robot 9 according to the ninth embodiment.

In addition, the first coil spring 161 and the second coil spring 171, as well as the pair of magnets 164 and the pair of magnets 174 may not be provided, and the first link mechanism 163 and the second link mechanism 173 may be arranged to extend. In other words, the first link mechanism 163 may have a base end attached to a shaft 162a of the first motor 162, and have a leading end directly attached to the cover 15 to be detachable. In addition, the second link mechanism 173 may have a base end attached to a shaft 172a of the second motor 172, and have a leading end directly attached to the cover 15 to be detachable.

Alternatively, in the above sixth and seventh embodiments, although a case of not including a mechanism swinging the cover 65, 75 has been explained as an example, the present invention is not limited thereto, and may be a configuration including the first swing mechanism 16 and second swing mechanism 17 so as to be the same as the robot 1 according to the first embodiment. Alternatively, it may be a configuration including the first swing mechanism 86 and second swing mechanism 87 so as to be the same as the robot 8 according to the eighth embodiment.

23

EXPLANATION OF REFERENCE NUMERALS

1, 2, 3, 4, 5, 6, 7, 8, 9, 10, 110, 120, 130, 140, 150, 160
  robot
11 drive unit
111 pedestal
112 drive wheel (wheel)
113 steered wheel (wheel)
12 torso part
121 torso lower part
122 torso upper part (vertical shaft)
122a, 122b support part
122c stopper
1221, 1222 vertical shaft
1223 support part
1224 connecting member
13, 23 neck part
14 head part
141 controller
142 imaging unit
143 microphone
144 display
145 speaker
146 transmitter
147 receiver
148 tilt mechanism
15, 55, 65, 75, 105 cover
151 left cover
1511 hole
1512 magnet
152 right cover
1521 hole
1522 magnet
153 front cover
154 rear cover
16, 86 first swing mechanism
161, 861 first coil spring (connecting member, elastic member, first elastic member, coil spring)
162, 862 first motor (motor)
162a, 862a shaft
163 first link mechanism (power transmission mechanism, link mechanism)
164 magnet
17, 87 second swing mechanism
171, 871 second coil spring (connecting member, elastic member, second elastic member, coil spring)
172, 872 second motor (motor)
172a, 872a shaft
173 second link mechanism (power transmission mechanism, link mechanism)
174 magnet
31 soft material
41 ring stay
51 concealing member
55a, 65a, 105a supported section
651 ring
652 balance weight
751 cover main body
752 support body
752a, 752b ring
753 ring
863 first cam (cam)
873 second cam (cam)
91 spiral spring (elastic member)

24

105b connecting member
105c ring

The invention claimed is:

1. A robot comprising:
a self-propelled drive unit;
a torso equipped to the drive unit; and
a head provided above the torso and having an imaging unit,
wherein the drive unit, the torso or the head has a transmitter which transmits a picture captured by the imaging unit as a signal to a user terminal, and
the robot further including a cover which covers the torso so as to have a space between the torso, and is swingable;
a motor serving as a power source which causes the cover to oscillate; and
a power transmission mechanism which transmits motive power of the motor to the cover,
wherein the drive unit, the torso or the head includes a controller which causes the motor to rotate to oscillate the cover, based on an advancing direction or turning direction of the drive unit.

2. The robot according to claim 1, wherein the controller starts swinging of the cover prior to the drive unit advancing or turning.

3. The robot according to claim 1, wherein the power transmission mechanism is a cam which rotates together with the motor to act on the cover.

4. The robot according to claim 1, further comprising a connecting member which connects the torso and the cover,
wherein the power transmission mechanism is a link mechanism which converts rotational power of the motor into translational power, and
wherein the connecting member has one end connected to the link mechanism, and another end connected to the cover.

5. The robot according to claim 4, wherein the connecting member is an elastic member.

6. The robot according to claim 1, wherein the controller causes the cover to swing so that a lower end of the cover tilts in a direction opposite to an advancing direction or turning direction of the drive unit.

7. The robot according to claim 1, wherein the controller causes the cover to swing so as to make a tilt based on a speed or acceleration of the drive unit.

8. The robot according to claim 1, further comprising a tilt mechanism which tilts the torso or the head,
wherein the controller causes the tilt mechanism to operate and tilt forward the torso or the head, in a case of swinging the cover.

9. The robot according to claim 8, wherein the controller causes the tilt mechanism to operate during advancing to tilt forward the torso or the head, and causes the tilt mechanism to operate during deceleration to tilt backward the torso or the head.

10. The robot according to claim 8, wherein the controller causes the tilt mechanism to operate to tilt forward the torso or the head at a fixed angle, in a case of speed not changing when advancing.

11. The robot according to claim 8, wherein the controller causes the tilt mechanism to operate during oblique movement to tilt the torso or the head in an opposite direction to a movement direction.

* * * * *